United States Patent
Mi et al.

(10) Patent No.: US 12,432,657 B2
(45) Date of Patent: Sep. 30, 2025

(54) COMMUNICATION METHOD AND APPARATUS

(71) Applicant: Huawei Technologies Co., Ltd., Shenzhen (CN)

(72) Inventors: Xiang Mi, Beijing (CN); Xiaolei Tie, Shanghai (CN); Zhihu Luo, Beijing (CN); Yuwan Su, Shenzhen (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 923 days.

(21) Appl. No.: 17/452,904

(22) Filed: Oct. 29, 2021

(65) Prior Publication Data
US 2022/0046539 A1 Feb. 10, 2022

Related U.S. Application Data

(63) Continuation of application No. PCT/CN2019/109621, filed on Sep. 30, 2019.

(30) Foreign Application Priority Data

Apr. 30, 2019 (WO) .................. PCT/CN2019/085379

(51) Int. Cl.
*H04W 52/02* (2009.01)
*H04W 68/02* (2009.01)
*H04W 72/121* (2023.01)

(52) U.S. Cl.
CPC ... *H04W 52/0229* (2013.01); *H04W 52/0216* (2013.01); *H04W 68/02* (2013.01); *H04W 72/121* (2013.01)

(58) Field of Classification Search
None
See application file for complete search history.

(56) References Cited

U.S. PATENT DOCUMENTS 10,165,545 B2 * 12/2018 Wu ..................... H04W 76/28
10,165,581 B2 * 12/2018 Tie ......................... H04W 4/70
11,290,981 B2 * 3/2022 Berggren ............ H04W 68/005
(Continued)

FOREIGN PATENT DOCUMENTS

CN 109309555 A 2/2019
WO 2018174635 A1 9/2018
(Continued)

OTHER PUBLICATIONS

Enovo et al., "UE-group wake-up signal for Rel-16 MTC", 3GPP TSG RAN WG1 Meeting #96bis, R1-1904565, Xi'an, China, Apr. 8-12, 2019, 4 pages.
(Continued)

*Primary Examiner* — Abdeltif Ajid
(74) *Attorney, Agent, or Firm* — Slater Matsil, LLP

(57) ABSTRACT

A communication method and apparatus are provided, where the method includes: determining, by a first device according to a first preset rule, a first resource in at least two preset resources corresponding to a same gap before a first paging occasion PO; and monitoring, by the first device, at least one wake-up signal sequence on the first resource. According to the foregoing method, the first resource used by the first device for monitoring the wake-up signal sequence is determined according to the first preset rule.

20 Claims, 6 Drawing Sheets

(56) References Cited

U.S. PATENT DOCUMENTS

| | | | |
|---|---|---|---|
| 11,895,618 B2* | 2/2024 | Su | H04L 1/0051 |
| 2016/0044605 A1* | 2/2016 | Vajapeyam | H04W 76/28 370/311 |
| 2017/0303235 A1* | 10/2017 | Deogun | H04W 68/005 |
| 2018/0270756 A1 | 9/2018 | Bhattad et al. | |
| 2018/0279256 A1* | 9/2018 | Wu | H04W 68/02 |
| 2019/0090190 A1* | 3/2019 | Liu | H04W 52/0235 |
| 2019/0239189 A1* | 8/2019 | Hwang | H04W 52/0216 |
| 2019/0349856 A1* | 11/2019 | Liu | H04W 52/0219 |
| 2020/0275375 A1* | 8/2020 | Liu | H04W 52/0216 |
| 2020/0403748 A1* | 12/2020 | Yokomakura | H04L 5/0048 |
| 2021/0314869 A1* | 10/2021 | Ye | H04L 67/145 |
| 2022/0295403 A1* | 9/2022 | Shrestha | H04W 4/70 |
| 2023/0021951 A1* | 1/2023 | Yang | H04W 76/28 |

FOREIGN PATENT DOCUMENTS

| | | |
|---|---|---|
| WO | 2019033112 A1 | 2/2019 |
| WO | 2019055417 A1 | 3/2019 |
| WO | 2019064208 A1 | 4/2019 |

OTHER PUBLICATIONS

3GPP TS 36.211 V15.4.0, (Dec. 2018), 3rd Generation Partnership Project, Technical Specification Group Radio Access Network, Evolved Universal Terrestrial Radio Access (E-UTRA), Physical channels and modulation (Release 15), Sophia Antipolis, Valbonne, France, 40 pages.

LG Electronics, "Discussion on UE-grouping wake up signal in MTC", 3GPP TSG RAN WG1#96bis, R1-1904605, Xi'an, China, Apr. 8-12, 2019, 8 pages.

Ericsson et al., "New WID on Rel-16 enhancements for NB-IOT", 3GPP TSG RAN Meeting #80, RP-181451, La Jolla, CA, US, Jun. 11-14, 2018, 4 pages.

Samsung, "UE-group wake-up signal for eMTC", 3GPP TSG RAN WG 1 Meeting #96bis, R1-1904374, Xi'an, China, Apr. 8-12, 2019, 3 pages.

3GPP TS 36.304 V15.3.0 (Mar. 2019), 3rd Generation Partnership Project; Technical Specification Group Radio Access Network; Evolved Universal Terrestrial Radio Access (E-UTRA); User Equipment (UE) procedures in idle mode (Release 15), 55 pages.

R1-1904605 3GPP TSG RAN WG1 #96bis Xi'an, China, Apr. 8-12, 2019, Agenda Item: 6.2.1.1 Source: LG Electronics, Title: Discussion on UE-grouping wake up signal in MTC, Document for: Discussion and decision, total 7 pages.

* cited by examiner

COMMUNICATION METHOD AND APPARATUS

CROSS-REFERENCE TO RELATED APPLICATIONS

This application is a continuation of International Application No. PCT/CN2019/109621, filed on Sep. 30, 2019, which claims priority to International Application No. PCT/CN2019/085379, filed on Apr. 30, 2019. The disclosures of the aforementioned applications are hereby incorporated by reference in their entireties.

TECHNICAL FIELD

This application relates to the field of wireless communication technologies, and in particular, to a communication method and apparatus.

BACKGROUND

In a narrowband internet of things (NB-IoT) system, a network device periodically sends paging signals to indicate whether a terminal device should switch from an idle state to a connected state, to exchange service data with the terminal device. The terminal device in the idle state periodically wakes up to detect the paging signals. A periodic wakeup cycle is referred to as a discontinuous reception (DRX) cycle, and a wakeup location is referred to as a paging occasion (PO). The terminal performs blind detection in search space starting from a PO location. If obtaining a narrowband physical downlink control channel (NPDCCH) through blind detection, the terminal determines that the terminal needs to switch to the connected state. Otherwise, the terminal remains in the idle state.

During actual application, a probability that the network device pages the terminal device is usually quite low. Therefore, to reduce a frequency at which the terminal device periodically detects the paging signals, the network device may send a wake-up signal (WUS) sequence before the PO location, to indicate whether the terminal device needs to wake up at the PO location. When there is the NPDCCH on the PO, the network device sends the wake-up signal sequence before the PO, to indicate that the terminal device needs to wake up at the PO location; or when there is no NPDCCH on the PO, the network device does not send the wake-up signal sequence. Correspondingly, before the PO, if the terminal device obtains the wake-up signal sequence through detection, the terminal device blindly detects the NPDCCH at a start of the PO location; or if the terminal device does not obtain the wake-up signal sequence through detection, the terminal device does not blindly detect the NPDCCH at the start of the PO location.

In NB-IoT R15, a preset resource used to send the wake-up signal sequence is defined before the PO. However, in NB-IoT R16, two preset resources used to send wake-up signal sequences are defined before the PO, and both the two preset resources are used to send a group wake-up signal sequence and a common wake-up signal sequence, where a first preset resource is the same as the preset resource defined in NB-IoT R15, and a second preset resource is a resource newly added based on NB-IoT R15. Currently, a network side does not determine to select which preset resource to send the group wake-up signal sequence and the common wake-up signal sequence for the terminal device. Correspondingly, the terminal device does not determine to select which preset resource to monitor the group wake-up signal sequence and the common wake-up signal sequence either.

SUMMARY

An objective of implementations of this application is to provide a communication method and apparatus, to resolve a problem of how a terminal device determines a resource for monitoring a wake-up signal sequence.

According to a first aspect, an embodiment of this application provides a communication method, including: determining, by a first device according to a first preset rule, a first resource in at least two preset resources corresponding to a same gap before a first paging occasion PO; and monitoring, by the first device, at least one wake-up signal sequence on the first resource.

According to the foregoing method, the first resource used by the first device to monitor the wake-up signal sequence is determined according to the first preset rule, to determine the resource for monitoring the wake-up signal sequence. According to the method, this can further avoid that the first device always monitors wake-up signal sequences on one resource, and is unnecessarily woken up because common wake-up signal sequences are often received, and consequently a false alarm probability that the first device is woken up is quite high.

In a possible design, the method further includes: determining, by the first device according to the first preset rule, a second resource in at least two preset resources corresponding to a same gap before a second PO, where a resource index value of the second resource in the at least two preset resources corresponding to the same gap before the second PO is different from a resource index value of the first resource in the at least two preset resources corresponding to the same gap before the first PO; and monitoring, by the first device, at least one wake-up signal sequence on the second resource.

In a possible design, the first preset rule includes: determining, based on first indication information from a second device, a resource used to monitor the wake-up signal sequence; and the determining a first resource includes: determining that the first resource is a resource that is in the at least two preset resources and that is indicated by the first indication information.

In a possible design, the first preset rule includes: determining the resource index value based on at least one of an identifier of the first device, a system frame number of the first PO, a hyper frame number of the first PO, and a discontinuous reception cycle of the first device; and determining that the first resource is a preset resource that is in the at least two preset resources corresponding to the same gap before the first PO and that corresponds to the resource index value, where each of the at least two preset resources corresponding to the same gap before the first PO corresponds to one resource index value.

In a possible design, the resource index value satisfies one of the following formulas:

$$Val = \left( f(\text{UE\_ID}) + \left( \left\lfloor \frac{SFN}{\text{DRX\_cycle}} \right\rfloor \bigg/ T_{location} \right) \right) \bmod N; \text{ and}$$

$$Val = \left( f(\text{UE\_ID}) + \left( \left\lfloor \frac{1024 * HFN + SFN}{\text{DRX\_cycle}} \right\rfloor \bigg/ T_{location} \right) \right) \bmod N$$

where Val represents the resource index value, UE_ID is the identifier of the first device, f(UE_ID) is a function of UE_ID, the SFN represents the system frame number of the first PO, the HFN represents the hyper frame number of the first PO, $T_{location}$ represents a preset transformation cycle, DRX_cycle represents the discontinuous reception cycle of the first device, N represents a quantity of preset resources corresponding to a same gap before each PO, mod represents a modulo operation, and $\lfloor\ \rfloor$ represents a rounding down operation.

In a possible design, the first preset rule includes: determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device; and determining that the first resource is a preset resource that is in the at least two preset resources corresponding to the same gap before the first PO and that corresponds to the resource index value, where each of the at least two preset resources corresponding to the same gap before the first PO corresponds to one resource index value.

In a possible design, the determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device includes: determining Y based on the group identifier of the device group to which the first device belongs, the quantity of device groups configured on the preset resource, the system frame number of the system frame in which the first PO is located, the hyper frame number of the hyper frame in which the first PO is located, and the discontinuous reception cycle of the first device; and determining the resource index value based on Y, where Y satisfies the following formula:

$$Y = \left(N_{ID}^{Group} + M \cdot \left\lfloor \frac{SFN + 1024 * HFN}{DRX\_cycle} \right\rfloor \right) \mod(N_{total})$$

where $N_{ID}^{Group}$ represents the group identifier of the device group to which the first device belongs, M represents a preset value, a value range of M is [0, P], P represents a minimum value of a quantity of device groups configured on the at least two preset resources, the SFN represents the system frame number of the system frame in which the first PO is located, the HFN represents the hyper frame number of the hyper frame in which the first PO is located, DRX_cycle represents the discontinuous reception cycle of the first device, $N_{total}$ represents a sum of quantities of device groups configured on all of the at least two preset resources, mod represents a modulo operation, and $\lfloor\ \rfloor$ represents a rounding down operation.

In a possible design, the determining the resource index value based on Y includes: determining, as the resource index value, an index value that is in a preset mapping table and that corresponds to Y, where the preset mapping table includes at least one correspondence, and each correspondence includes one value of Y and an index value corresponding to Y.

In a possible design, the determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device includes: determining Y based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device; and determining the resource index value based on Y, where Y satisfies the following formula:

$$Y = \left(N_{ID}^{Group} + \left\lfloor \frac{SFN + 1024 * HFN}{DRX\_cycle} \right\rfloor \right) \mod(N_{resource})$$

where $N_{ID}^{Group}$ represents the group identifier of the device group to which the first device belongs, $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and $\lfloor\ \rfloor$ represents a rounding down operation.

In a possible design, the determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device includes: determining Y based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device; and determining the resource index value based on Y, where Y satisfies the following formula:

$$Y = \left(\frac{N_{ID}^{Group}}{N_{le}} + \left\lfloor \frac{SFN + 1024 * HFN}{DRX\_cycle} \right\rfloor \right) \mod(N_{resource})$$

where $N_{ID}^{Group}$ represents the group identifier of the device group to which the first device belongs, quantities of device groups configured on all of the at least two preset resources are the same, $N_{le}$ represents the quantity of device groups configured on each of the at least two preset resources, $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and $\lfloor \rfloor$ represents a rounding down operation.

In a possible design, the determining the resource index value based on Y includes: using Y as the resource index value.

In a possible design, each preset resource corresponds to at least one group, each group includes at least one first device, and the first preset rule includes: determining that the resource for monitoring the wake-up signal sequence is a preset resource that is in at least two preset resources corresponding to a same gap before a PO and that corresponds to the group identifier of the group to which the first device belongs.

In a possible design, the quantity of groups corresponding to the preset resource is configured by the second device.

In a possible design, a quantity of the at least one wake-up signal sequence is 3 or 4.

According to a second aspect, an embodiment of this application provides a communication apparatus. The communication apparatus includes a processor, and the processor is coupled to a memory. The memory is configured to store instructions, and the processor is configured to execute the instructions stored in the memory, to perform the method according to any one of the first aspect or the possible designs of the first aspect. Optionally, the communication apparatus may further include the memory. Optionally, the communication apparatus may further include a transceiver, configured to support the communication apparatus in sending and/or receiving the information in the foregoing method. Optionally, the communication apparatus may be a terminal device, or may be an apparatus, for example, a chip or a chip system, in the terminal device. The chip system includes at least one chip, and the chip system may further include another circuit structure and/or discrete device.

An embodiment of this application further provides a communication apparatus, configured to implement the first aspect or any method in the first aspect, and including corresponding function modules, for example, a processing unit and a transceiver unit, that are separately configured to implement the steps in the foregoing method.

According to a third aspect, an embodiment of this application provides a communication method, including: determining, by a second device according to a first preset rule, a first resource in at least two preset resources corresponding to a same gap before a first paging occasion PO; and sending, by the second device, a wake-up signal sequence to a first device on the first resource.

According to the foregoing method, the first resource used by the second device to send the wake-up signal sequence is determined according to the first preset rule, to determine the resource for sending the wake-up signal sequence. According to the method, the following problem can be further avoided: The first device always monitors wake-up signal sequences on one resource, and is unnecessarily woken up because common wake-up signal sequences are often received, and consequently a false alarm probability that the first device is woken up is quite high.

In a possible design, the method further includes: determining, by the second device according to the first preset rule, a second resource in at least two preset resources corresponding to a same gap before a second PO, where a resource index value of the second resource in the at least two preset resources corresponding to the same gap before the second PO is different from a resource index value of the first resource in the at least two preset resources corresponding to the same gap before the first PO; and sending, by the second device, a wake-up signal sequence to the first device on the second resource.

In a possible design, the first preset rule includes: determining the resource index value based on at least one of an identifier of the first device, a system frame number of the first PO, a hyper frame number of the first PO, and a discontinuous reception cycle of the first device; and determining that the first resource is a preset resource that is in the at least two preset resources corresponding to the same gap before the first PO and that corresponds to the resource index value, where each of the at least two preset resources corresponding to the same gap before the first PO corresponds to one resource index value.

In a possible design, the resource index value satisfies one of the following formulas:

$$Val = \left(f(\text{UE\_ID}) + \left(\left\lfloor \frac{SFN}{\text{DRX\_cycle}} \right\rfloor \middle/ T_{location}\right)\right) \bmod N; \text{ and}$$

$$Val = \left(f(\text{UE\_ID}) + \left(\left\lfloor \frac{1024 * HFN + SFN}{\text{DRX\_cycle}} \right\rfloor \middle/ T_{location}\right)\right) \bmod N$$

where Val represents the resource index value, UE_ID is the identifier of the first device, f(UE_ID) is a function of UE_ID, the SFN represents the system frame number of the first PO, the HFN represents the hyper frame number of the first PO, $T_{location}$ represents a preset transformation cycle, DRX_cycle represents the discontinuous reception cycle of the first device, N represents a quantity of preset resources corresponding to a same gap before each PO, mod represents a modulo operation, and $\lfloor \rfloor$ represents a rounding down operation.

In a possible design, the first preset rule includes: determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device; and determining that the first resource is a preset resource that is in the at least two preset resources corresponding to the same gap before the first PO and that corresponds to the resource index value, where each of the at least two preset resources corresponding to the same gap before the first PO corresponds to one resource index value.

In a possible design, the determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device includes: determining Y based on the group identifier of the device group to which the first device belongs, the quantity of device groups configured on the preset resource, the system frame number of the system frame in which the first PO is located, the hyper frame number of the hyper frame in which the first PO is located, and the discontinuous reception cycle of the first device; and determining the resource index value based on Y, where Y satisfies the following formula:

$$Y = \left(N_{ID}^{Group} + M \cdot \left\lfloor \frac{SFN + 1024*HFN}{DRX\_cycle} \right\rfloor\right) \bmod(N_{total})$$

where $N_{ID}^{Group}$ represents the group identifier of the device group to which the first device belongs, M represents a preset value, a value range of M is [0, P], P represents a minimum value of a quantity of device groups configured on the at least two preset resources, the SFN represents the system frame number of the system frame in which the first PO is located, the HFN represents the hyper frame number of the hyper frame in which the first PO is located, DRX_cycle represents the discontinuous reception cycle of the first device, $N_{total}$ represents a sum of quantities of device groups configured on all of the at least two preset resources, mod represents a modulo operation, and $\lfloor \ \rfloor$ represents a rounding down operation.

In a possible design, the determining the resource index value based on Y includes: determining, as the resource index value, an index value that is in a preset mapping table and that corresponds to Y, where the preset mapping table includes at least one correspondence, and each correspondence includes one value of Y and an index value corresponding to Y.

In a possible design, the determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device includes: determining Y based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device; and determining the resource index value based on Y, where Y satisfies the following formula:

$$Y = \left(N_{ID}^{Group} + \left\lfloor \frac{SFN + 1024*HFN}{DRX\_cycle} \right\rfloor\right) \bmod(N_{resource})$$

where $N_{ID}^{Group}$ represents the group identifier of the device group to which the first device belongs, $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and $\lfloor \ \rfloor$ represents a rounding down operation.

In a possible design, the determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device includes: determining Y based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device; and determining the resource index value based on Y, where Y satisfies the following formula:

$$Y = \left(\frac{N_{ID}^{Group}}{N_{le}} + \left\lfloor \frac{SFN + 1024*HFN}{DRX\_cycle} \right\rfloor\right) \bmod(N_{resource})$$

where $N_{ID}^{Group}$ represents the group identifier of the device group to which the first device belongs, quantities of device groups configured on all of the at least two preset resources are the same, $N_{le}$ represents the quantity of device groups configured on each of the at least two preset resources, $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and $\lfloor \ \rfloor$ represents a rounding down operation.

In a possible design, the determining the resource index value based on Y includes: using Y as the resource index value.

In a possible design, each preset resource corresponds to at least one group, each group includes at least one first device, and the first preset rule includes: determining that the resource for monitoring the wake-up signal sequence is a preset resource that is in at least two preset resources corresponding to a same gap before a PO and that corresponds to the group identifier of the group to which the first device belongs.

In a possible design, the method further includes: configuring, by the second device, the quantity of groups corresponding to the preset resource.

According to a fourth aspect, an embodiment of this application provides a communication apparatus. The communication apparatus includes a processor, and the processor is coupled to a memory. The memory is configured to store instructions, and the processor is configured to execute the instructions stored in the memory, to perform the method according to any one of the third aspect or the possible designs of the third aspect. Optionally, the communication apparatus may further include the memory. Optionally, the communication apparatus may further include a transceiver, configured to support the communication apparatus in sending and/or receiving the information in the foregoing method. Optionally, the communication apparatus may be a terminal device or a network device, or may be an apparatus, for example, a chip or a chip system, in the terminal device or the network device. The chip system includes at least one chip, and the chip system may further include another circuit structure and/or discrete device.

An embodiment of this application further provides a communication apparatus, configured to implement the third aspect or any method in the third aspect, and including corresponding function modules, for example, a processing unit and a transceiver unit, that are separately configured to implement the steps in the foregoing method.

According to a fifth aspect, an embodiment of this application provides a communication method, including: determining, by a first device according to a second preset rule, at least one first wake-up signal sequence to be monitored on a first preset resource before a first paging occasion PO; and monitoring, by the first device, the at least one first wake-up signal sequence on the first preset resource.

According to the foregoing method, the first device may determine, by using the second preset rule, the at least one wake-up signal sequence that needs to be monitored. Because the second preset rule is predefined, even if a group to which the first device belongs changes, the at least one wake-up signal sequence that needs to be monitored can be determined. In addition, in this method, a second device does not need to actively notify the first device, to avoid additional signaling overheads and improve system efficiency.

In a possible design, quantities of wake-up signal sequences determined by the first device before different POs according to the second preset rule are different; and/or generation parameter sets of at least one wake-up signal sequence determined by the first device before the different POs according to the second preset rule are different, where the generation parameter set includes at least one generation parameter, each generation parameter can be used to generate one wake-up signal sequence, and the generation parameter is determined based on a group identifier of a group to which the first device belongs.

In a possible design, the method further includes: determining, by the first device according to the second preset rule, at least one second wake-up signal sequence to be monitored on a second preset resource before a second PO, where a quantity of the at least one second wake-up signal sequence is different from a quantity of the at least one first wake-up signal sequence, and/or a generation parameter set of the at least one second wake-up signal sequence is different from a generation parameter set of the at least one first wake-up signal sequence, where the generation parameter set includes the at least one generation parameter, the generation parameter can be used to generate the wake-up signal sequence, and the generation parameter is determined based on the group identifier of the group to which the first device belongs.

In a possible design, the second preset rule is: determining a first identifier based on at least one of an identifier of the first device, a system frame number of the first PO, a hyper frame number of the first PO, and a discontinuous reception cycle of the first device; and using, in a preset mapping table corresponding to the first identifier, a wake-up signal sequence corresponding to the group identifier of the group to which the first device belongs as a wake-up signal sequence to be monitored before the first PO, where the preset mapping table includes at least one mapping relationship, each mapping relationship is a mapping relationship between a sequence index value or a generation parameter of a wake-up signal sequence and at least one group identifier, and each group identifier corresponds to one group of devices.

In a possible design, the first identifier satisfies one of the following formulas:

$$\text{Set\_ID} = \left( f(\text{UE\_ID}) + \left\lfloor \frac{SFN}{\text{DRX\_cycle}} \right\rfloor \right) \bmod M; \text{ and}$$

$$\text{Set\_ID} = \left( f(\text{UE\_ID}) + \left\lfloor \frac{1024 * HFN + SFN}{\text{DRX\_cycle}} \right\rfloor \right) \bmod M$$

where Set_ID represents the first identifier, UE_ID represents the identifier of the first device, f(UE_ID) is a function of UE_ID, an SFN represents the system frame number of the first PO, an HFN represents the hyper frame number of the first PO, DRX_cycle represents the discontinuous reception cycle of the first device, M represents a total quantity of preset mapping tables corresponding to the first preset resource, mod represents a modulo operation, $\lfloor \ \rfloor$ represents a rounding down operation, the preset mapping table includes at least one mapping relationship, each mapping relationship is a mapping relationship between a sequence index value of a wake-up signal sequence and at least one group identifier, and each group identifier corresponds to a group of devices.

In a possible design, M is received by the first device from the second device.

In a possible design, the quantity of the at least one first wake-up signal sequence is 3 or 4.

According to a sixth aspect, an embodiment of this application provides a communication apparatus. The communication apparatus includes a processor, and the processor is coupled to a memory. The memory is configured to store instructions, and the processor is configured to execute the instructions stored in the memory, to perform the method according to any one of the fifth aspect or the possible designs of the fifth aspect. Optionally, the communication apparatus may further include the memory. Optionally, the communication apparatus may further include a transceiver, configured to support the communication apparatus in sending and/or receiving the information in the foregoing method. Optionally, the communication apparatus may be a terminal device, or may be an apparatus, for example, a chip or a chip system, in the terminal device. The chip system includes at least one chip, and the chip system may further include another circuit structure and/or discrete device.

An embodiment of this application further provides a communication apparatus, configured to implement the fifth aspect or any method in the fifth aspect, and including corresponding function modules, for example, a processing unit and a transceiver unit, that are separately configured to implement the steps in the foregoing method.

According to a seventh aspect, an embodiment of this application provides a communication method, including: determining, by a second device, at least one first wake-up signal sequence according to a second preset rule; and sending, by the second device, one of the at least one first wake-up signal sequence on a first preset resource before a first paging occasion PO.

In a possible design, quantities of wake-up signal sequences determined by the second device before different POs according to the second preset rule are different; and/or generation parameter sets of at least one wake-up signal sequence determined by the second device before the different POs according to the second preset rule are different, where the generation parameter set includes at least one generation parameter, each generation parameter can be used to generate one wake-up signal sequence, and the generation parameter is determined based on a group identifier of a group to which a first device belongs.

According to the foregoing method, the second device may determine, by using the second preset rule, the wake-up signal sequence that needs to be sent. Because the second preset rule is predefined, even if the group to which the first device belongs changes, the wake-up signal sequence that needs to be sent to the first device can be determined. In addition, in this method, the second device does not need to actively notify the first device, to avoid additional signaling overheads and improve system efficiency.

In a possible design, the method further includes: determining, by the second device according to the second preset rule, at least one second wake-up signal sequence to be monitored on a second preset resource before a second PO, where a quantity of the at least one second wake-up signal sequence is different from a quantity of the at least one first wake-up signal sequence, and/or a generation parameter set of the at least one second wake-up signal sequence is different from a generation parameter set of the at least one first wake-up signal sequence, where the generation parameter set includes the at least one generation parameter, the generation parameter can be used to generate the wake-up signal sequence, and the generation parameter is determined based on the group identifier of the group to which the first device belongs.

In a possible design, the second preset rule is: determining a first identifier based on at least one of an identifier of the first device, a system frame number of the first PO, a hyper frame number of the first PO, and a discontinuous reception cycle of the first device; and using, in a preset mapping table corresponding to the first identifier, a wake-up signal sequence corresponding to the group identifier of the group to which the first device belongs as a wake-up signal sequence to be monitored before the first PO, where the preset mapping table includes at least one mapping relationship, each mapping relationship is a mapping relationship between a sequence index value or a generation parameter of a wake-up signal sequence and at least one group identifier, and each group identifier corresponds to one group of devices.

In a possible design, the first identifier satisfies one of the following formulas:

$$\text{Set\_ID} = \left( f(\text{UE\_ID}) + \left\lfloor \frac{SFN}{\text{DRX\_cycle}} \right\rfloor \right) \bmod M; \text{ and}$$

$$\text{Set\_ID} = \left( f(\text{UE\_ID}) + \left\lfloor \frac{1024 * HFN + SFN}{\text{DRX\_cycle}} \right\rfloor \right) \bmod M$$

where Set_ID represents the first identifier, UE_ID represents the identifier of the first device, f(UE_ID) is a function of UE_ID, an SFN represents the system frame number of the first PO, an HFN represents the hyper frame number of the first PO, DRX_cycle represents the discontinuous reception cycle of the first device, M represents a total quantity of preset mapping tables corresponding to the first preset resource, mod represents a modulo operation, ⌊ ⌋ represents a rounding down operation, the preset mapping table includes at least one mapping relationship, each mapping relationship is a mapping relationship between a sequence index value of a wake-up signal sequence and at least one group identifier, and each group identifier corresponds to a group of devices.

In a possible design, the quantity of the at least one first wake-up signal sequence is 3 or 4.

According to an eighth aspect, an embodiment of this application provides a communication apparatus. The communication apparatus includes a processor, and the processor is coupled to a memory. The memory is configured to store instructions, and the processor is configured to execute the instructions stored in the memory, to perform the method according to any one of the seventh aspect or the possible designs of the seventh aspect. Optionally, the communication apparatus may further include the memory. Optionally, the communication apparatus may further include a transceiver, configured to support the communication apparatus in sending and/or receiving the information in the foregoing method. Optionally, the communication apparatus may be a terminal device or a network device, or may be an apparatus, for example, a chip or a chip system, in the terminal device or the network device. The chip system includes at least one chip, and the chip system may further include another circuit structure and/or discrete device.

An embodiment of this application further provides a communication apparatus, configured to implement the seventh aspect or any method in the seventh aspect, and including corresponding function modules, for example, a processing unit and a transceiver unit, that are separately configured to implement the steps in the foregoing method.

An embodiment of this application provides a computer-readable storage medium. The computer storage medium stores computer-readable instructions. When a computer reads and executes the computer-readable instructions, a communication apparatus is enabled to perform the method in any one of the foregoing possible designs.

An embodiment of this application provides a computer program product. When a computer reads and executes the computer program product, a communication apparatus is enabled to perform the method in any one of the foregoing possible designs.

An embodiment of this application provides a chip. The chip is connected to a memory, and is configured to read and execute a software program stored in the memory, to implement the method in any one of the foregoing possible designs.

DETAILED DESCRIPTION OF ILLUSTRATIVE EMBODIMENTS

The following further describes in detail embodiments of this application with reference to the accompanying drawings.

The embodiments of this application may be applied to communication systems such as an NB-IoT system, an enhanced machine type communication (eMTC) system, a new radio (NR) system, a global system for mobile communication (GSM) system, a code division multiple access (CDMA) system, a wideband code division multiple access (WCDMA) system, a long term evolution (LTE) system, and a long term evolution-advanced (LTE-A) system. This is not specifically limited herein. In the embodiments of this application, an NB-IoT network scenario is used as an example to describe some scenarios. It should be noted that the solutions in the embodiments of this application may further be applied to another wireless communication network, and a corresponding name may also be replaced with a name of a corresponding function in the another wireless communication network.

Figure 1:
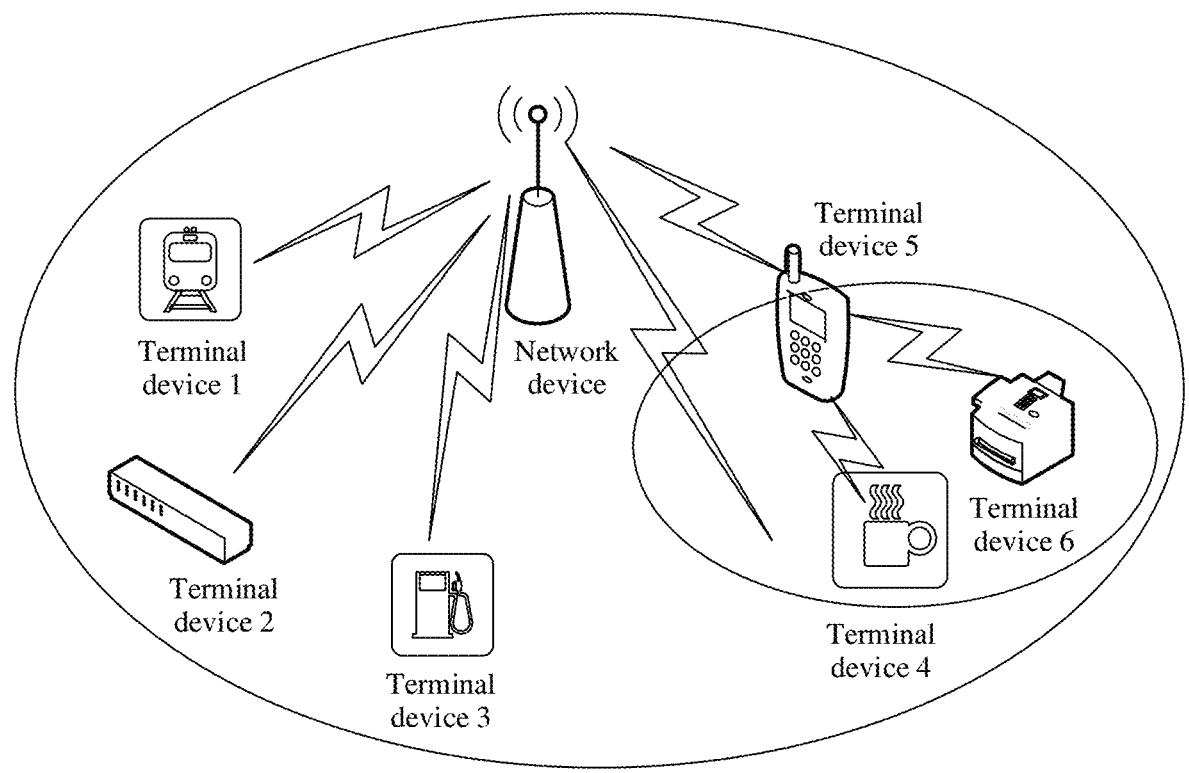
FIG. 1 is a schematic diagram of a communication system to which a communication method according to an embodiment of this application is applicable.

For ease of understanding the embodiments of this application, a communication system shown in FIG. 1 is first used as an example to describe in detail a communication system to which the embodiments of this application are applicable. FIG. 1 is a schematic diagram of a communication system to which a communication method according to an embodiment of this application is applicable. As shown in FIG. 1, a communication system includes a network device and a terminal device 1 to a terminal device 6. In the communication system, the terminal device 1 to the terminal device 6 may send uplink data to the network device, or the network device may send downlink data to the terminal device 1 to the terminal device 6. In addition, a communication system may alternatively include the terminal device 4 to the terminal device 6. In this case, in the communication system, the network device may send downlink data of the terminal device 4 and the terminal device 6 to the terminal device 5, and then the terminal device 5 forwards the downlink data to the terminal device 4 and the terminal device 6.

In the embodiments of this application, a terminal device may be a device having a wireless transceiver function or a chip that may be disposed on any device, and may also be referred to as user equipment (UE), an access terminal, a subscriber unit, a subscriber station, a mobile station, a remote station, a remote terminal, a mobile device, a user terminal, a wireless communication device, a user agent, or a user apparatus. The terminal device in the embodiments of this application may be a mobile phone, a tablet computer (Pad), a computer having a wireless transceiver function, a virtual reality (VR) terminal, an augmented reality (AR) terminal, a wireless terminal in industrial control, a wireless terminal in self driving (self driving), a wireless terminal in telemedicine, a wireless terminal in a smart grid, a wireless terminal in transportation safety, a wireless terminal in a smart city, a wireless terminal in a smart home, or the like.

A network device may be an evolved NodeB (eNB) in the LTE system, may be a base transceiver station (BTS) in a global system for mobile communication (GSM) system or a code division multiple access (CDMA) system, or may be a NodeB (NB) in a wideband code division multiple access (WCDMA) system or the like.

Figure 2:
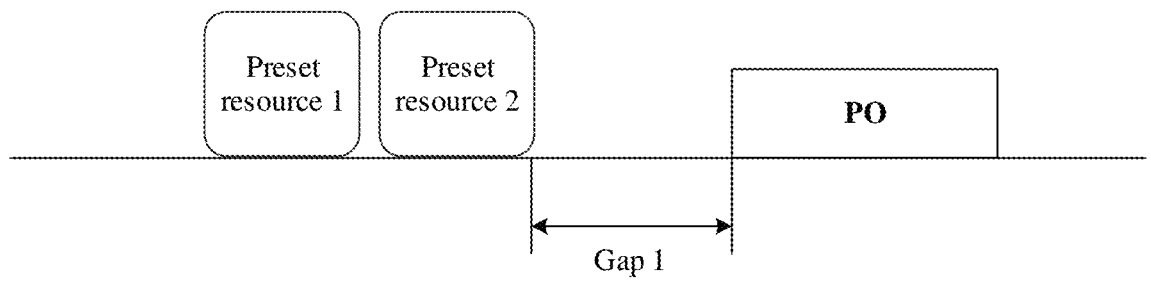
FIG. 2 is a schematic diagram of a preset resource before a PO according to an embodiment of this application.

Currently, in the NB-IoT system, a gap before a PO may include at least two preset resources used to send wake-up signal sequences, where the gap is a time length between an end location of a preset resource closest to the PO in at least one preset resource and a start location of the PO. For example, as shown in FIG. 2, before a PO in FIG. 2, a gap 1 corresponds to two preset resources, and the two preset resources are resources defined in NB-IoT R16. It should be noted that, in NB-IoT R15, only a preset resource that is closer to the PO in FIG. 2 is defined. The network device may send wake-up signal sequences on both the two preset resources, or may send a wake-up signal sequence on only one of the preset resources.

There are two types of wake-up signal sequences. One type may be referred to as a common wake-up signal sequence, and the other type may be referred to as a group wake-up signal sequence. The common wake-up signal sequence may wake all terminal devices up. That is, when receiving the common wake-up signal sequence, any terminal device needs to wake up at a PO location. The group wake-up signal sequence corresponds to a group of terminal devices. The correspondence is pre-established. The group wake-up signal sequence may wake only the group of terminal devices up. When receiving a group wake-up signal sequence that does not correspond to a group to which a terminal device belongs, the terminal device ignores the group wake-up signal sequence, and does not wake up at the PO location. On the preset resource defined in NB-IoT R15, an R15 wake-up signal sequence may be used as the common wake-up signal sequence. If a terminal device supports NB-IoT R16, when the terminal device keeps monitoring the preset resource defined in NB-IoT R15, the terminal device is woken up because common wake-up signal sequences are continuously received. Actually, the terminal device may not need to be woken up. Therefore, there is no determined solution to reducing a probability that the terminal device is mistakenly woken up.

Figure 3:
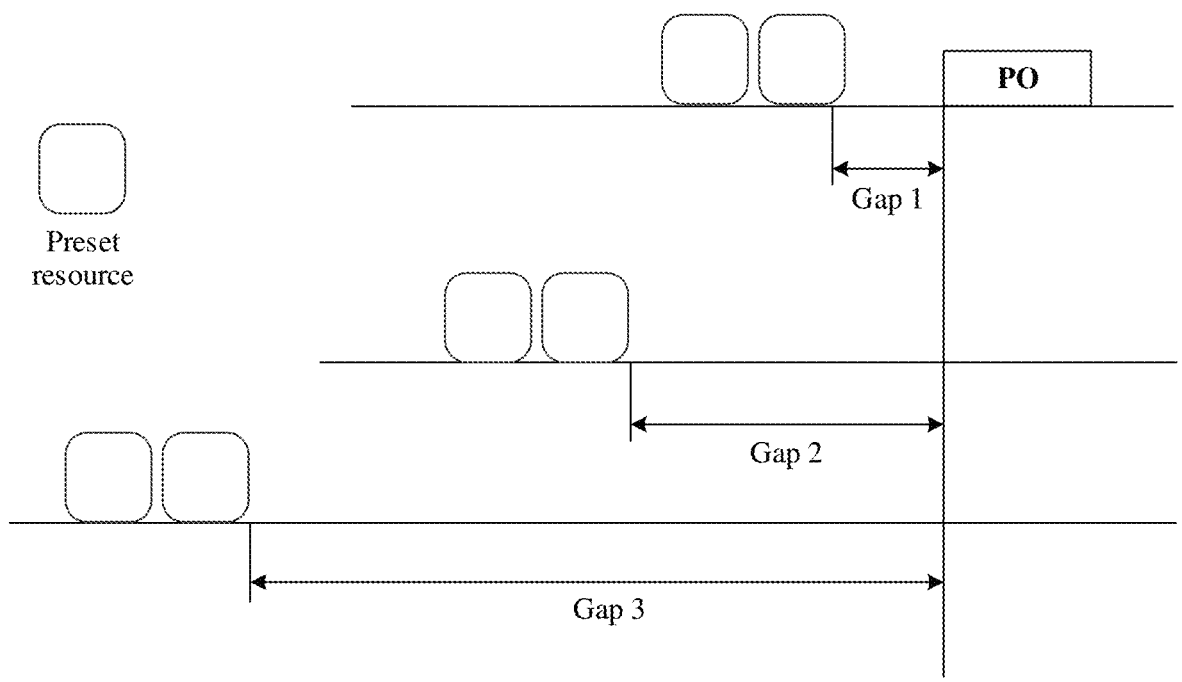
FIG. 3 is a schematic diagram of a preset resource before another PO according to an embodiment of this application.

It should be noted that there may be a plurality of gaps before one PO, and each gap corresponds to at least two preset resources. For example, as shown in FIG. 3, there are three gaps before a PO in FIG. 3: a gap 1, a gap 2, and a gap 3, and each gap corresponds to two preset resources.

Figure 4:
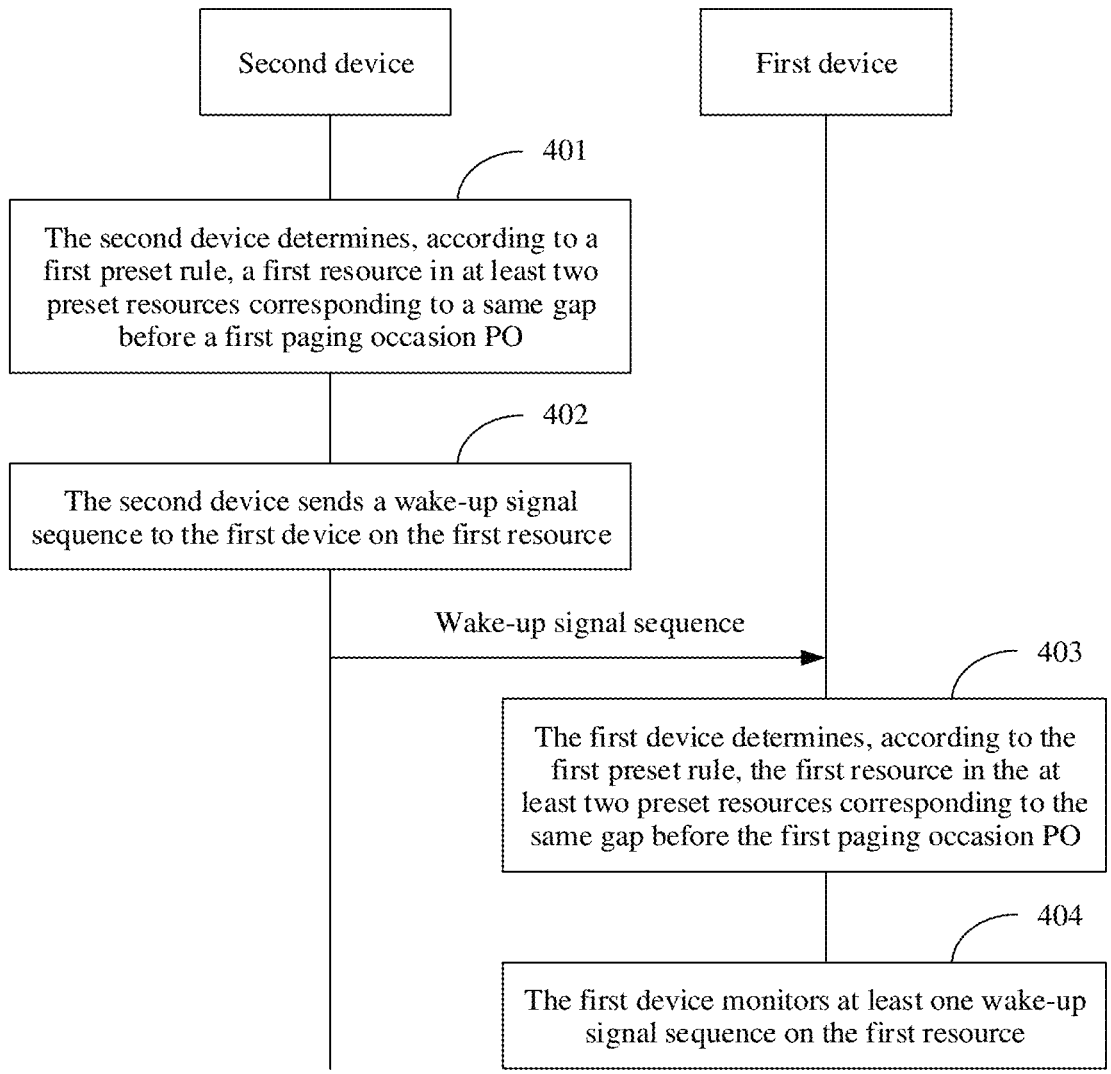
FIG. 4 is a schematic flowchart of a communication method according to an embodiment of this application.

With reference to the foregoing descriptions, FIG. 4 is a schematic flowchart of a communication method according to an embodiment of this application. In FIG. 4, a first device may be a terminal device, and a second device may be a network device. In this embodiment of this application, both the first device and the second device may alternatively be terminal devices. Further, the first device may be a terminal device that supports NB-IoT R15 or NB-IoT R16. Refer to FIG. 4. The method includes the following steps.

Step 401: The second device determines, according to a first preset rule, a first resource in at least two preset resources corresponding to a same gap before a first paging occasion PO.

Step 402: The second device sends a wake-up signal sequence to the first device on the first resource.

Step 403: The first device determines, according to the first preset rule, the first resource in the at least two preset resources corresponding to the same gap before the first paging occasion PO.

Step 404: The first device monitors at least one wake-up signal sequence on the first resource.

A quantity of the at least one wake-up signal sequence is L. A value of L is not limited, for example, may be 3 or 4. The value of L may be configured by the second device that sends the at least one wake-up signal sequence, or may be agreed on in another manner. Details are not described herein again.

According to the foregoing method, the first resource used by the first device for monitoring the wake-up signal sequence is determined according to the first preset rule. Therefore, this can avoid that the first device always monitors wake-up signal sequences on one resource, and is unnecessarily woken up because common wake-up signal sequences are often received, and consequently a false alarm probability that the first device is woken up is quite high.

In this embodiment of this application, resource index values of resources determined by the first device before different POs according to the first preset rule are different or the same. Alternatively, in K resource index values of K resources determined by the first device before K consecutive POs according to the first preset rule, there are different resource index values, where K is an integer greater than 1. The resource index value is used to indicate a location of the resource in at least two preset resources corresponding to a same gap before the PO.

For example, with reference to FIG. 2, a resource index value may be preset for each preset resource before a PO. For example, a resource index value of a preset resource that is far away from the PO is 0, that is, a resource index value of a preset resource 1 is 0. A resource index value of a preset resource that is close to the PO is 1, that is, a resource index value of a preset resource 2 is 1. In this embodiment of this application, five resource index values of five resources determined by the first device before five consecutive POs are 0, 1, 0, 1, and 0.

For another example, the first device determines, according to the first preset rule, a second resource in at least two preset resources corresponding to a same gap before a second PO, where a resource index value of the second resource in the at least two preset resources corresponding to the same gap before the second PO is different from a resource index value of the first resource in the at least two preset resources corresponding to the same gap before the first PO.

According to this method, it can be ensured that the first device does not monitor the wake-up signal sequence on one preset resource each time, thereby reducing a probability that the first device receives a wake-up signal sequence that the first device does not expect to receive.

Resource index values of resources determined before all POs may be different, or may be the same. For example, a resource index value of a resource determined by the first device before a PO 1 is 0, and a resource index value of a resource determined by the first device before a PO 2 is 2.

In this embodiment of this application, the first preset rule may be implemented in a plurality of manners. The following separately describes the plurality of manners.

In a first possible implementation, the first preset rule includes: determining, based on first indication information from the second device, a resource for monitoring the wake-up signal sequence, where the second device is a device for sending the wake-up signal sequence.

In this case, the first device may use, as the first resource, a resource that is in the at least two preset resources and that is indicated by the first indication information.

For example, the first indication information indicates to monitor the wake-up signal sequence on a preset resource closest to the PO 1 before the PO 1 and monitor the wake-up signal sequence on a preset resource farthest away from the PO 2 before the PO 2. The first device only needs to monitor the wake-up signal sequence on a corresponding preset resource according to an indication of the first indication information.

According to this method, it can be ensured, based on the first indication information, that a wake-up signal sequence that the first device needs to monitor can be monitored, to improve a success rate of receiving the wake-up signal sequence by the first device.

In a second possible implementation, the first preset rule includes: determining the resource index value based on at least one of an identifier of the first device, a system frame number of the first PO, a hyper frame number of the first PO, and a discontinuous reception cycle of the first device.

As described above, in this embodiment of this application, each of at least two preset resources corresponding to a same gap before each PO corresponds to one resource index value. Therefore, the first device may use a preset resource that is in the at least two preset resources corresponding to the same gap before the first PO and that corresponds to the resource index value as a resource, namely, the first resource, for monitoring the wake-up signal sequence.

It should be noted that a same method may be used to determine the resource index value for the second PO. Details are not described herein again.

For example, with reference to FIG. 2, the resource index value of the preset resource 1 is 0, and the resource index value of the preset resource 2 is 1.

When the resource index value determined by the first device according to the first preset rule is 0, the first device monitors the wake-up signal sequence on the preset resource 1. Correspondingly, when the determined resource index value is 1, the first device monitors the wake-up signal sequence on the preset resource 2.

There may be a plurality of scenarios for how to specifically determine the resource index value. For example, the resource index value satisfies one of the following formulas:

$$Val = \left( f(UE\_ID) + \left( \left\lfloor \frac{SFN}{DRX\_cycle} \right\rfloor \bigg/ T_{location} \right) \right) \bmod N; \text{ and} \quad \text{Formula (1)}$$

$$Val = \left( f(UE\_ID) + \left( \left\lfloor \frac{1024 * HFN + SFN}{DRX\_cycle} \right\rfloor \bigg/ T_{location} \right) \right) \bmod N \quad \text{Formula (2)}$$

Val represents the resource index value, UE_ID represents the identifier of the first device, f(UE_ID) is a function of UE_ID, the SFN represents the system frame number (system frame number, SFN) of the first PO, the HFN represents the hyper frame number (hyper system frame number, HSFN) of the first PO, $T_{location}$ represents a preset transformation cycle, DRX_cycle represents the discontinuous reception cycle of the first device, N represents a quantity of the preset resources corresponding to the same gap before the PO, mod represents a modulo operation, and ⌊ ⌋ represents a rounding down operation. One hyper frame includes 1024 system frames. It should be noted that f(UE_ID) is a value obtained by performing an operation on UE_ID. For example, a modulo operation may be performed on UE_ID. For example, f(UE_ID)=UE_ID mod X, where X is a preset value. Alternatively, the function is UE_ID, that is, f(UE_ID)=UE_ID.

For example, with reference to FIG. 2, the resource index value of the preset resource 1 is 0, and the resource index value of the preset resource 2 is 1. It is assumed that f(UE_ID)=0, DRX_cycle=128, and $T_{location}$=2. Resource index values determined before POs in different system frames may be shown in Table 1.

TABLE 1

| System frame number of a PO | Resource index value |
| --- | --- |
| 32 | 0 |
| 32 + 128 = 160 | 0 |
| 32 + 128*2 = 288 | 1 |
| 32 + 128*3 = 416 | 1 |
| 32 + 128*4 = 544 | 0 |
| 32 + 128*5 = 672 | 0 |

It should be noted that the foregoing description is merely an example, and there may be a plurality of variations of the foregoing formulas, which are not described herein one by one by using examples.

In a third possible implementation, the first preset rule includes: determining that the resource for monitoring the wake-up signal sequence is a preset resource that is in the at least two preset resources corresponding to the same gap before the PO and that corresponds to a group identifier of a group to which the first device belongs.

In this embodiment of this application, a plurality of devices may be grouped into one group, and all devices in each group are distinguished by using a group identifier. Therefore, it may be stipulated in advance that there is a mapping relationship between each preset resource corresponding to the same gap before the PO and at least one group identifier. In this case, the first device may monitor the wake-up signal sequence on the preset resource corresponding to the group identifier of the group to which the first device belongs.

For example, with reference to FIG. 2, it is assumed that six groups are included, and group identifiers are 0 to 5. Devices in four groups whose group identifiers are 0, 1, 2, and 3 monitor a wake-up signal sequence on the preset resource 1, and devices in two groups whose group identifiers are 4 and 5 monitor a wake-up signal sequence on the preset resource 2. When determining that the group identifier of the group to which the first device belongs is 2, the first device monitors the wake-up signal sequence on the preset resource 1. When determining that the group identifier of the group to which the first device belongs is 5, the first device monitors the wake-up signal sequence on the preset resource 2. Details of other cases are not described.

For example, a quantity of groups corresponding to each preset resource before the PO is configured by the second device. It should be noted that quantities of groups corresponding to all preset resources may be the same, or may be different. This is not limited in this embodiment of this application.

For example, with reference to FIG. 2, the second device may send N1 and N2 to the first device, where N1 represents a quantity of corresponding groups on the preset resource 1, and N2 represents a quantity of corresponding groups on the preset resource 2. N1 and N2 are integers greater than or equal to 0.

For another example, the second device may send N and N1 to the first device, where N1 represents the quantity of corresponding groups on the preset resource 1, and N represents a sum of the quantity of corresponding groups on the preset resource 2 and the quantity of corresponding groups on the preset resource 1. The first device may determine: Quantity N2 of corresponding groups on the preset resource 2=N−N1.

In a fourth possible implementation, the first preset rule includes: determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device.

As described above, in this embodiment of this application, each of at least two preset resources corresponding to a same gap before each PO corresponds to one resource index value. Therefore, the first device may use a preset resource that is in the at least two preset resources corresponding to the same gap before the first PO and that corresponds to the resource index value as the first resource. In this way, the first device may monitor the wake-up signal sequence on the first resource. The following separately describes, by using different embodiments, how the first device specifically determines the resource index value.

Embodiment 1 in the Fourth Possible Implementation

In Embodiment 1, at least one device group may be configured on each of the at least two preset resources corresponding to the same gap before the first PO, and quantities of device groups configured on all preset resources may be the same, or may be different. Each group is distinguished by using a group identifier.

It should be noted that, when the first device is a terminal device, one device group includes at least one terminal device. Correspondingly, the device group may be referred to as a UE group.

The first device may determine Y based on the group identifier of the device group to which the first device belongs, the quantity of device groups configured on the preset resource, the system frame number of the system frame in which the first PO is located, the hyper frame number of the hyper frame in which the first PO is located, and the discontinuous reception cycle of the first device.

Further, the first device may determine the resource index value based on Y.

Y satisfies the following formula:

$$Y = \left(N_{ID}^{Group} + M \cdot \left\lfloor \frac{SFN + 1024 * HFN}{DRX\_cycle} \right\rfloor\right) \bmod(N_{total})$$

$N_{ID}^{Group}$ represents the group identifier of the device group to which the first device belongs. Assuming that $N_{total}$ represents a sum of quantities of device groups configured on all of the at least two preset resources corresponding to the same gap before the first PO, values of group identifiers of device groups configured on the at least two preset resources may start from 0, where the values of the group identifiers are integers, and a value range of the group identifiers is [0, $N_{total}$−1]. Certainly, the values of the group identifiers of the device groups may alternatively be set in another manner. This is not limited in this embodiment of this application.

M represents a preset value, a value range of M is [0, P], and a value of M may be agreed on in advance, or may be configured by the second device. P represents a smallest value in the quantities of device groups configured on the at least two preset resources. For example, the same gap before the first PO corresponds to two preset resources: a preset resource 1 and a preset resource 2. A quantity of device groups configured on the preset resource 1 is N1, and a quantity of device groups configured on the preset resource 2 is Nw. In this case, a value of P is a smaller value in N1 and Nw.

The SFN represents the system frame number of the system frame in which the first PO is located, the HFN represents the hyper frame number of the hyper frame in which the first PO is located, DRX_cycle represents the discontinuous reception cycle of the first device, mod represents the modulo operation, and $\lfloor\ \rfloor$ represents the rounding down operation.

In Embodiment 1, there may be a plurality of implementations of specifically determining the resource index value based on Y. In a possible implementation, a preset mapping table may be pre-established, where the preset mapping table includes at least one correspondence, and each correspondence includes one value of Y and an index value corresponding to Y. When Y is determined according to the foregoing formula, the index value corresponding to Y in the preset mapping table may be determined as the resource index value.

For example, it is assumed that the same gap before the first PO corresponds to two preset resources: a legacy WUS resource and a new WUS resource, a resource index value of the legacy WUS resource is 0, and a resource index value of the new WUS resource is 1. The legacy WUS resource is a time-frequency location that is of the WUS and that is specified in R15, and the new WUS resource is a resource whose time location and/or frequency location are/is different from those/that of the legacy WUS resource. In the NB-IoT, the new WUS resource is before the legacy WUS resource in terms of a time location.

Assuming that a quantity of device groups configured on the legacy WUS resource is $N_{legacy}$, and a quantity of device groups configured on the new WUS resource is $N_{new}$, the pre-established preset mapping table may be shown in Table 2.

TABLE 2

| Y | Resource index value |
|---|---|
| $Y \in [0, N_{legacy} - 1]$ | Resource index value = 0: legacy WUS resource |
| $Y \in [N_{legacy}, N_{legacy} + N_{new} - 1]$ | Resource index value = 1: new WUS resource |

With reference to Table 2, when it is determined that Y is 0, it may be determined that the resource index value is 0. When it is determined that Y is $N_{legacy}$, it may be determined that the resource index value is 1. Other cases are not described again.

For another example, it is assumed that the same gap before the first PO corresponds to four preset resources: a preset resource 0, a preset resource 1, a preset resource 2, and a preset resource 3, and corresponding resource index values are respectively 0, 1, 2, and 3. Quantities of device groups configured on the preset resources are $N_0$, $N_1$, $N_2$, and $N_3$. In this case, the pre-established preset mapping table may be shown in Table 3.

TABLE 3

| Y | Resource index value |
|---|---|
| $Y \in [0, N_0 - 1]$ | 0 |
| $Y \in [N_0, N_0 + N_1 - 1]$ | 1 |
| $Y \in [N_0 + N_1, N_0 + N_2 - 1]$ | 2 |
| $Y \in [N_0 + N_1 + N_2, N_0 + N_1 + N_2 + N_3 - 1]$ | 3 |

The foregoing description is merely an example, and there may be other cases, which are not described herein one by one by using examples.

It should be noted that a same method may be used to determine the resource index value for the second PO. Details are not described herein again.

Embodiment 2 in the Fourth Possible Implementation

In Embodiment 2, each of the at least two preset resources corresponding to the same gap before the first PO may correspond to at least one device group, quantities of device groups configured on all preset resources are the same, and each device group is distinguished by using a group identifier.

Specifically, Y may be determined based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device. Further, the resource index value is determined based on Y.

Y satisfies the following formula:

$$Y = \left(N_{ID}^{Group} + \left\lfloor \frac{SFN + 1024 * HFN}{DRX\_cycle} \right\rfloor\right) \bmod(N_{resource})$$

$N_{ID}^{Group}$ represents the group identifier of the device group to which the first device belongs. $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and $\lfloor\ \rfloor$ represents a rounding down operation.

In Embodiment 2, how to specifically determine the resource index value based on Y is not limited in this embodiment of this application. For example, Y may be used as the resource index value, a sum of Y and a preset weight value may be used as the resource index value, or a difference between Y and the preset weight value may be used as the resource index value. Examples are not described one by one.

Embodiment 3 in the Fourth Possible Implementation

In Embodiment 3, each of the at least two preset resources corresponding to the same gap before the first PO may correspond to at least one device group, quantities of device groups configured on all preset resources are the same, and each device group is distinguished by using a group identifier.

Specifically, Y may be determined based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device. Further, the resource index value may be determined based on Y.

Y satisfies the following formula:

$$Y = \left( \frac{N_{ID}^{Group}}{N_{le}} + \left\lfloor \frac{SFN + 1024 * HFN}{DRX\_cycle} \right\rfloor \right) \mod(N_{resource})$$

where $N_{ID}^{Group}$ represents the group identifier of the device group to which the first device belongs, quantities of device groups configured on all of the at least two preset resources are the same, $N_{le}$ represents the quantity of device groups configured on each of the at least two preset resources, $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and ⌊ ⌋ represents a rounding down operation.

In Embodiment 3, how to specifically determine the resource index value based on Y is not limited in this embodiment of this application. For example, Y may be used as the resource index value, a sum of Y and a preset weight value may be used as the resource index value, or a difference between Y and the preset weight value may be used as the resource index value. Examples are not described one by one.

It should be noted that in this embodiment of this application, there may be another implementation of the first preset rule, provided that the first preset rule can implement that the resource index values of the resources determined before the different POs are different or the same, or in the K resource index values of the K resources determined before the K consecutive POs, there are the different resource index values. Examples are not described one by one herein.

It should be noted that, in this embodiment of this application, when sending the wake-up signal sequence to the first device, the second device may determine, by using a same method used by the first device, the first resource for sending the wake-up signal sequence. For details, refer to the description about how the first device determines the first resource. Details are not described herein again.

As described above, currently, a plurality of devices may be grouped into one group, and each group is distinguished by using a group identifier. Devices are divided into a plurality of groups, at least one wake-up signal sequence may be allocated to each group of devices, and a device in the group wakes up at a PO location when obtaining, through monitoring, any wake-up signal sequence corresponding to the group. Correspondingly, the device in the group may keep a sleep state at the PO location when obtaining, through monitoring, a wake-up signal sequence corresponding to another group.

For example, assuming that there are six groups of devices, a correspondence between the six groups of devices and wake-up signal sequences may be shown in Table 4.

TABLE 4

| Sequence index value of a wake-up signal sequence | Function of the wake-up signal sequence | Device that can be woken up |
| --- | --- | --- |
| #1 | Common wake-up signal sequence | All six groups of devices |
| #2 | Wake-up signal sequence corresponding to a group identifier 1 | Device in a group corresponding to the group identifier 1 |
| #3 | Wake-up signal sequence corresponding to a group identifier 2 | Device in a group corresponding to the group identifier 2 |
| #4 | Wake-up signal sequence corresponding to a group identifier 3 | Device in a group corresponding to the group identifier 3 |
| #5 | Wake-up signal sequence corresponding to a group identifier 4 | Device in a group corresponding to the group identifier 4 |
| #6 | Wake-up signal sequence corresponding to a group identifier 5 | Device in a group corresponding to the group identifier 5 |
| #7 | Wake-up signal sequence corresponding to a group identifier 6 | Device in a group corresponding to the group identifier 6 |
| #8 | Wake-up signal sequence corresponding to the group identifiers 1, 2, and 3 | Devices in the groups corresponding to the group identifiers 1, 2, and 3 |
| #9 | Wake-up signal sequence corresponding to the group identifiers 4, 5, and 6 | Devices in the groups corresponding to the group identifiers 4, 5, and 6 |

In Table 4, the sequence index value of the wake-up signal sequence is used to identify the wake-up signal sequence. When the group identifier of the group to which the first device belongs is 1, the first device needs to monitor wake-up signal sequences whose sequence index values are #1, #2, and #8; when the group identifier of the group to which the first device belongs is 5, the first device needs to monitor wake-up signal sequences whose sequence index values are #1, #6, and #9. Other cases are not described again.

It can be learned from the foregoing description that there are many combinations between different groups. Because a group of a terminal device may often change, a wake-up signal sequence that the terminal device needs to monitor may also often change. Therefore, how the terminal device determines the wake-up signal sequence that needs to be monitored is an urgent problem to be resolved.

Therefore, an embodiment of this application provides a communication method. When signaling overheads are not increased, a terminal device may determine, in real time, a wake-up signal sequence that needs to be monitored. Details are described below.

Figure 5:
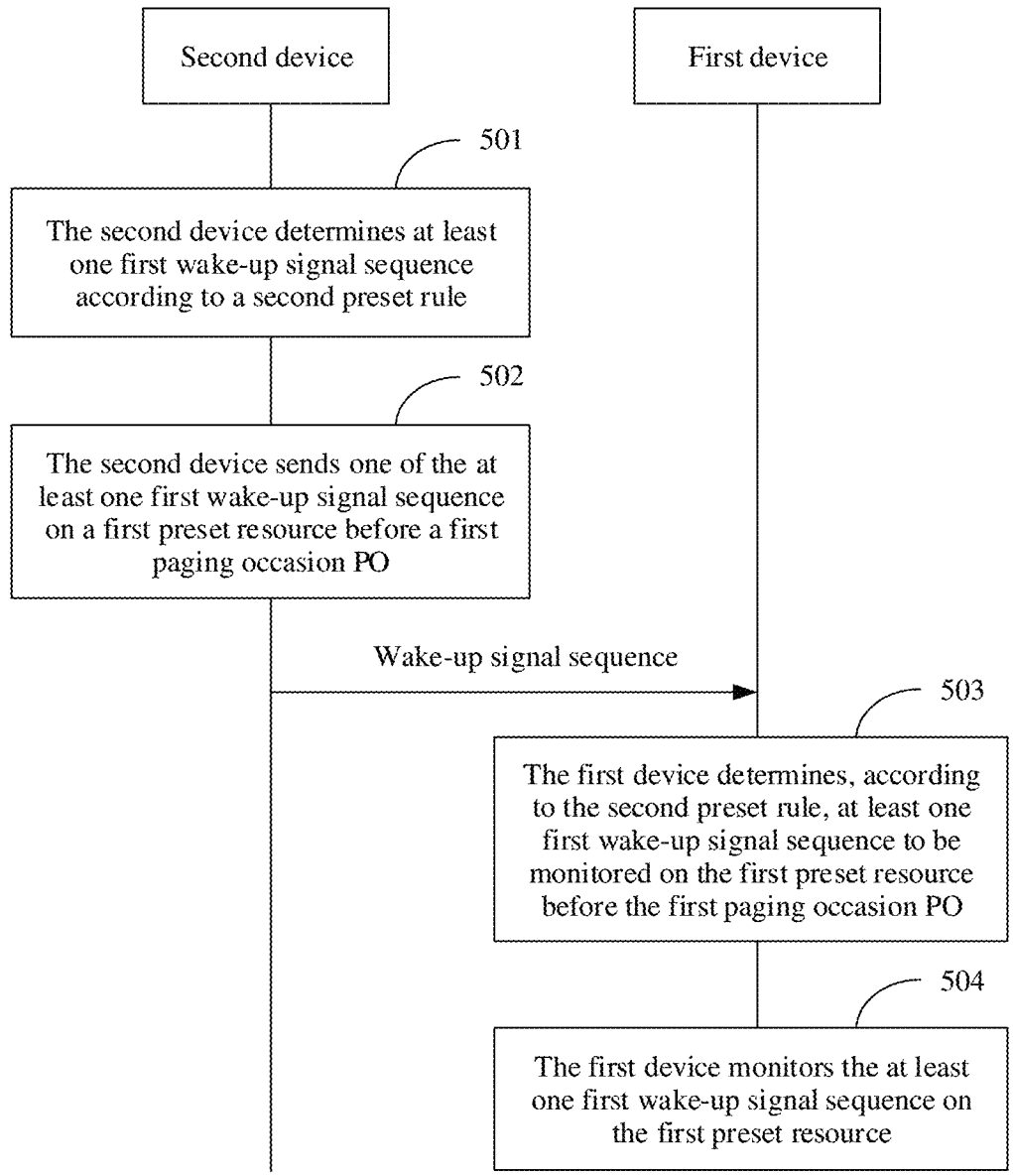
FIG. 5 is a schematic flowchart of a communication method according to an embodiment of this application.

With reference to the foregoing descriptions, FIG. 5 is a schematic flowchart of a communication method according to an embodiment of this application. In FIG. 5, a first device may be a terminal device, and a second device may be a network device. In this embodiment of this application, both the first device and the second device may alternatively be terminal devices. Further, the first device may be a terminal device that supports NB-IoT R15 or NB-IoT R16. Refer to FIG. 5. The method includes the following steps.

Step 501: The second device determines at least one first wake-up signal sequence according to a second preset rule.

Step 502: The second device sends one of the at least one first wake-up signal sequence on a first preset resource before a first paging occasion PO.

Step 503: The first device determines, according to the second preset rule, the at least one first wake-up signal sequence to be monitored on the first preset resource before the first paging occasion PO.

Step 504: The first device monitors the at least one first wake-up signal sequence on the first preset resource.

It should be noted that, in step 502 and step 504, the first preset resource may be determined according to a first preset rule. For details about how to determine the first preset resource, refer to descriptions in the procedure shown in FIG. 4. Details are not described herein again.

A quantity of the at least one first wake-up signal sequence is L. A value of L is not limited, for example, may be 3 or 4. The value of L may be configured by the second device, or may be agreed on in another manner. Details are not described herein again.

According to the foregoing method, the first device may determine, by using the second preset rule, the at least one wake-up signal sequence that needs to be monitored. Because the second preset rule is predefined, even if a group to which the first device belongs changes, the at least one wake-up signal sequence that needs to be monitored can be determined. In addition, in this method, the second device does not need to actively notify the first device, to avoid additional signaling overheads and improve system efficiency.

In this embodiment of this application, quantities of wake-up signal sequences determined before different POs according to the second preset rule are different or the same; and/or generation parameter sets of the at least one wake-up signal sequence determined before the different POs according to the second preset rule are different, where the generation parameter set includes at least one generation parameter, each generation parameter can be used to generate one wake-up signal sequence, and the generation parameter is determined based on a group identifier of a group to which the first device belongs.

For example, the first device may further determine, according to the second preset rule, at least one second wake-up signal sequence to be monitored on a second preset resource before a second PO.

A quantity of the at least one second wake-up signal sequence is different from the quantity of the at least one first wake-up signal sequence, and/or a generation parameter set of the at least one second wake-up signal sequence is different from a generation parameter set of the at least one first wake-up signal sequence. The generation parameter set includes the at least one generation parameter, the generation parameter is used to generate the wake-up signal sequence, and the generation parameter is determined based on the group identifier of the group to which the first device belongs.

In this embodiment of this application, the second preset rule may include: determining a first identifier based on at least one of an identifier of the first device, a system frame number of the first PO, a hyper frame number of the first PO, and a discontinuous reception cycle of the first device; and using, in a preset mapping table corresponding to the first identifier, a wake-up signal sequence corresponding to the group identifier of the group to which the first device belongs as a wake-up signal sequence to be monitored before the first PO, where the preset mapping table includes at least one mapping relationship, each mapping relationship is a mapping relationship between a sequence index value or a generation parameter of a wake-up signal sequence and at least one group identifier, and each group identifier corresponds to one group of devices.

For example, assuming that there are six groups of devices, and group identifiers are 1 to 6, correspondences between the six groups of devices and wake-up signal sequences may be shown in Table 5, Table 6, and Table 7.

TABLE 5

Identifier of a preset mapping table: 0

| Sequence index value of a wake-up signal sequence | Group identifier |
|---|---|
| #1 | 1 to 6 |
| #2 | 1 |
| #3 | 2 |
| #4 | 3 |
| #5 | 4 |
| #6 | 5 |
| #7 | 6 |
| #8 | 1, 2, and 3 |
| #9 | 4, 5, and 6 |

TABLE 6

Identifier of a preset mapping table: 1

| Sequence index value of a wake-up signal sequence | Group identifier |
|---|---|
| #1 | 1 to 6 |
| #2 | 1 and 2 |
| #3 | 2 and 3 |
| #4 | 3 and 4 |
| #5 | 4 and 5 |
| #6 | 5 and 6 |
| #7 | 1 and 6 |

TABLE 7

Identifier of a preset mapping table: 2

| Sequence index value of a wake-up signal sequence | Group identifier |
|---|---|
| #1 | 1 to 6 |
| #2 | 1, 2, and 3 |
| #3 | 4, 5, and 6 |

The group identifier of the group to which the first device belongs is 2. When the determined first identifier is 0, index values of wake-up signal sequences that the first device needs to monitor are #1, #3, and #8. When the determined first identifier is 2, index values of wake-up signal sequences that the first device needs to monitor are #1 and #2. Other cases are not described again.

It should be noted that a same method may be used to determine the first identifier for the second PO. Details are not described herein again.

There may be a plurality of scenarios for how to specifically determine the first identifier. For example, the first identifier satisfies one of the following formulas:

$$\text{Set\_ID} = \left( f(\text{UE\_ID}) + \left\lfloor \frac{SFN}{\text{DRX\_cycle}} \right\rfloor \right) \bmod M; \quad \text{Formula (3)}$$

and $$\text{Set\_ID} = \left( f(\text{UE\_ID}) + \left\lfloor \frac{1024 * HFN + SFN}{\text{DRX\_cycle}} \right\rfloor \right) \bmod M \quad \text{Formula (4)}$$

Set_ID represents the first identifier, UE_ID represents the identifier of the first device, f(UE_ID) is a function of UE_ID, an SFN represents the system frame number of the first PO, an HFN represents the hyper frame number of the first PO, DRX_cycle represents the discontinuous reception cycle of the first device, M represents a total quantity of preset mapping tables corresponding to the first preset resource, mod represents a modulo operation, $\lfloor \ \rfloor$ represents a rounding down operation, the preset mapping table includes at least one mapping relationship, each mapping relationship is a mapping relationship between a sequence index value of a wake-up signal sequence and at least one group identifier, and each group identifier corresponds to a group of devices. It should be noted that f(UE_ID) is a value obtained by performing an operation on UE_ID. For example, a modulo operation may be performed on UE_ID. For example, f(UE_ID)=UE_ID mod X, where X is a preset value. Alternatively, the function is UE_ID, that is, f(UE_ID)=UE_ID.

It should be noted that a specific value of M may be configured by the second device. After configuring M, the second device sends M to the first device.

For example, with reference to Table 1, Table 4, and Table 5, it is assumed that f(UE_ID)=0, DRX_cycle=128, and M=3. As the SFN continuously increases, the first identifier determined according to formula (3) may be 0, 1, 2, 0, 1, 2, or the like.

It should be noted that, in this embodiment of this application, there may be another implementation of the second preset rule. Examples are not described herein one by one.

Further, optionally, in this embodiment of this application, each group of devices corresponds to a same quantity of wake-up signal sequences in each preset mapping table. For example, as shown in Table 5, each group of devices corresponds to three wake-up signal sequences.

According to this method, each group of devices need to monitor a same quantity of wake-up signal sequences, and it is ensured that the group of devices obtains a same monitoring occasion.

When a network device configures only one preset resource, and the preset resource is a Group WUS resource, that is, is used to send a group wake-up signal sequence, there are two possible locations of the preset resource. A location 1 overlaps a legacy WUS resource defined in NB-IoT R15. That is, the preset resource is the preset resource 2 in FIG. 2. A location 2 is on a resource located before the legacy WUS resource defined in NB-IoT R15, namely, a resource newly defined in NB-IoT R16, and the preset resource 1 in FIG. 2.

In this case, a preset resource on which a terminal device monitors a wake-up signal sequence is an urgent problem to be resolved.

In a possible implementation, the network device sends second indication information to the terminal device, where the second indication information is used to indicate the resource for monitoring the wake-up signal sequence. After receiving the second indication information, the terminal device may use, as the resource for monitoring the wake-up signal sequence, the resource indicated by the second indication information in two preset resources corresponding to a same gap before a PO.

In another possible implementation, when wake-up signal sequence maximum duration (WUS sequence maximum duration) of the terminal device is greater than or equal to a preset threshold, the terminal device uses, as the resource for monitoring the wake-up signal sequence, a resource 1 in the two preset resources corresponding to the same gap before the PO; when the wake-up signal sequence maximum duration (WUS sequence maximum duration) of the terminal device is less than the preset threshold, the terminal device uses, as the resource for monitoring the wake-up signal sequence, a resource 2 in the two preset resources corresponding to the same gap before the PO. The resource 1 is a preset resource that is in the two preset resources in the same gap and whose start location is closer to a start location of the PO; the resource 2 is a preset resource that is in the two preset resources in the same gap and whose start location is farther away from the start location of the PO.

The foregoing is merely an example, and the resource for monitoring the wake-up signal sequence may alternatively be determined based on at least one of the wake-up signal sequence maximum duration and nB. nB represents paging density, namely, a quantity of POs in one DRX cycle. A value range is {4T, 2T, T, T/2, T/4, T/8, T/16, T/32, T/64, T/128, T/256, T/512, T/1024}, where T is a preset cycle.

Figure 6:
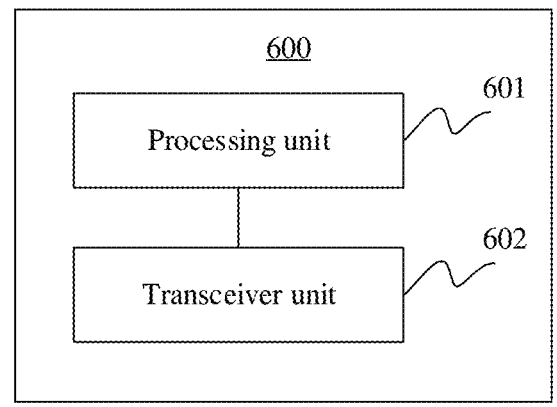
FIG. 6 is a schematic diagram of a structure of a communication apparatus according to an embodiment of this application.

FIG. 6 is a schematic diagram of a structure of a communication apparatus according to an embodiment of this application. The communication apparatus may be configured to perform actions of the first device in the foregoing method embodiments. The communication apparatus 600 includes a processing unit 601 and a transceiver unit 602.

When the communication apparatus 600 performs actions of the first device in the procedure shown in FIG. 4: the processing unit 601 is configured to determine, according to a first preset rule, a first resource in at least two preset resources corresponding to a same gap before a first paging occasion PO; and the transceiver unit 602 is configured to monitor at least one wake-up signal sequence on the first resource.

In a possible design, the processing unit 601 is further configured to: determine, according to the first preset rule, a second resource in at least two preset resources corresponding to a same gap before a second PO, where a resource index value of the second resource in the at least two preset resources corresponding to the same gap before the second PO is different from a resource index value of the first resource in the at least two preset resources corresponding to the same gap before the first PO; and the transceiver unit 602 is further configured to monitor at least one wake-up signal sequence on the second resource.

In a possible design, the first preset rule includes: determining, based on first indication information from a second device, a resource used to monitor the wake-up signal sequence; and determining the first resource includes: determining that the first resource is a resource that is in the at least two preset resources and that is indicated by the first indication information.

In a possible design, the first preset rule includes: determining the resource index value based on at least one of an identifier of the first device, a system frame number of the first PO, a hyper frame number of the first PO, and a discontinuous reception cycle of the first device; and determining that the first resource is a preset resource that is in the at least two preset resources corresponding to the same gap before the first PO and that corresponds to the resource index value, where each of the at least two preset resources corresponding to the same gap before the first PO corresponds to one resource index value.

In a possible design, the resource index value satisfies one of the following formulas:

$$Val = \left(f(\text{UE\_ID}) + \left(\left\lfloor \frac{SFN}{\text{DRX\_cycle}} \right\rfloor \Big/ T_{location}\right)\right) \bmod N; \text{ and}$$

$$Val = \left(f(\text{UE\_ID}) + \left(\left\lfloor \frac{1024 * HFN + SFN}{\text{DRX\_cycle}} \right\rfloor \Big/ T_{location}\right)\right) \bmod N$$

where Val represents the resource index value, UE_ID is the identifier of the first device, f(UE_ID) is a function of UE_ID, the SFN represents the system frame number of the first PO, the HFN represents the hyper frame number of the first PO, $T_{location}$ represents a preset transformation cycle, DRX_cycle represents the discontinuous reception cycle of the first device, N represents a quantity of preset resources corresponding to a same gap before each PO, mod represents a modulo operation, and $\lfloor \ \rfloor$ represents a rounding down operation.

In a possible design, the first preset rule includes: determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device; and determining that the first resource is a preset resource that is in the at least two preset resources corresponding to the same gap before the first PO and that corresponds to the resource index value, where each of the at least two preset resources corresponding to the same gap before the first PO corresponds to one resource index value.

In a possible design, the processing unit is specifically configured to: determine Y based on the group identifier of the device group to which the first device belongs, the quantity of device groups configured on the preset resource, the system frame number of the system frame in which the first PO is located, the hyper frame number of the hyper frame in which the first PO is located, and the discontinuous reception cycle of the first device; and determine the resource index value based on Y, where Y satisfies the following formula:

$$Y = \left(N_{ID}^{Group} + M \cdot \left\lfloor \frac{SFN + 1024 * HFN}{\text{DRX\_cycle}} \right\rfloor\right) \bmod(N_{total}) \text{ where } N_{ID}^{Group}$$

represents the group identifier of the device group to which the first device belongs, M represents a preset value, a value range of M is [0, P], P represents a minimum value of a quantity of device groups configured on the at least two preset resources, the SFN represents the system frame number of the system frame in which the first PO is located, the HFN represents the hyper frame number of the hyper frame in which the first PO is located, DRX_cycle represents the discontinuous reception cycle of the first device, $N_{total}$ represents a sum of quantities of device groups configured on all of the at least two preset resources, mod represents a modulo operation, and $\lfloor \ \rfloor$ represents a rounding down operation.

In a possible design, the processing unit is specifically configured to: determine, as the resource index value, an index value that is in a preset mapping table and that corresponds to Y, where the preset mapping table includes at least one correspondence, and each correspondence includes one value of Y and an index value corresponding to Y.

In a possible design, the processing unit is specifically configured to: determine Y based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device; and determine the resource index value based on Y, where Y satisfies the following formula:

$$Y = \left(N_{ID}^{Group} + \left\lfloor \frac{SFN + 1024 * HFN}{\text{DRX\_cycle}} \right\rfloor\right) \bmod(N_{resource})$$

where $N_{ID}^{Group}$ represents the group identifier of the device group to which the first device belongs, $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and $\lfloor \ \rfloor$ represents a rounding down operation.

In a possible design, the processing unit is specifically configured to: determine Y based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device; and determine the resource index value based on Y, where Y satisfies the following formula:

$$Y = \left(\frac{N_{ID}^{Group}}{N_{le}} + \left\lfloor \frac{SFN + 1024 * HFN}{\text{DRX\_cycle}} \right\rfloor\right) \bmod(N_{resource})$$

where $N_{ID}^{Group}$ represents the group identifier of the device group to which the first device belongs, quantities of device groups configured on all of the at least two preset resources are the same, $N_{le}$ represents the quantity of device groups configured on each of the at least two preset resources, $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and $\lfloor \ \rfloor$ represents a rounding down operation.

In a possible design, the processing unit is specifically configured to: use Y as the resource index value.

In a possible design, each preset resource corresponds to at least one group, each group includes at least one first device, and the first preset rule includes: determining that the resource for monitoring the wake-up signal sequence is a preset resource that is in at least two preset resources corresponding to a same gap before a PO and that corresponds to the group identifier of the group to which the first device belongs.

In a possible design, the quantity of groups corresponding to the preset resource is configured by the second device.

In a possible design, a quantity of the at least one wake-up signal sequence is 3 or 4.

When the communication apparatus 600 performs actions of the first device in the procedure shown in FIG. 5: the processing unit 601 is configured to determine, according to a second preset rule, at least one first wake-up signal sequence to be monitored on a first preset resource before a first paging occasion PO; and the transceiver unit 602 is configured to monitor the at least one first wake-up signal sequence on the first preset resource.

In a possible design, quantities of wake-up signal sequences determined by the processing unit 601 before different POs according to the second preset rule are different; and/or generation parameter sets of at least one wake-up signal sequence determined by the processing unit 601 before the different POs according to the second preset rule are different, where the generation parameter set includes at least one generation parameter, each generation parameter can be used to generate one wake-up signal sequence, and the generation parameter is determined based on a group identifier of a group to which the first device belongs.

In a possible design, the processing unit 601 is further configured to: determine, according to the second preset rule, at least one second wake-up signal sequence to be monitored on a second preset resource before a second PO, where a quantity of the at least one second wake-up signal sequence is different from a quantity of the at least one first wake-up signal sequence, and/or a generation parameter set of the at least one second wake-up signal sequence is different from a generation parameter set of the at least one first wake-up signal sequence, where the generation parameter set includes the at least one generation parameter, the generation parameter can be used to generate the wake-up signal sequence, and the generation parameter is determined based on the group identifier of the group to which the first device belongs.

In a possible design, the second preset rule is: determining a first identifier based on at least one of an identifier of the first device, a system frame number of the first PO, a hyper frame number of the first PO, and a discontinuous reception cycle of the first device; and using, in a preset mapping table corresponding to the first identifier, a wake-up signal sequence corresponding to the group identifier of the group to which the first device belongs as a wake-up signal sequence to be monitored before the first PO, where the preset mapping table includes at least one mapping relationship, each mapping relationship is a mapping relationship between a sequence index value or a generation parameter of a wake-up signal sequence and at least one group identifier, and each group identifier corresponds to one group of devices.

In a possible design, the first identifier satisfies one of the following formulas:

$$\text{Set\_ID} = \left( f(\text{UE\_ID}) + \left\lfloor \frac{SFN}{\text{DRX\_cycle}} \right\rfloor \right) \bmod M; \text{ and}$$

$$\text{Set\_ID} = \left( f(\text{UE\_ID}) + \left\lfloor \frac{1024 * HFN + SFN}{\text{DRX\_cycle}} \right\rfloor \right) \bmod M$$

where Set_ID represents the first identifier, UE_ID represents the identifier of the first device, f(UE_ID) is a function of UE_ID, an SFN represents the system frame number of the first PO, an HFN represents the hyper frame number of the first PO, DRX_cycle represents the discontinuous reception cycle of the first device, M represents a total quantity of preset mapping tables corresponding to the first preset resource, mod represents a modulo operation, $\lfloor \ \rfloor$ represents a rounding down operation, the preset mapping table includes at least one mapping relationship, each mapping relationship is a mapping relationship between a sequence index value of a wake-up signal sequence and at least one group identifier, and each group identifier corresponds to a group of devices.

In a possible design, M is received by the first device from the second device.

In a possible design, the quantity of the at least one first wake-up signal sequence is 3 or 4.

Figure 7:
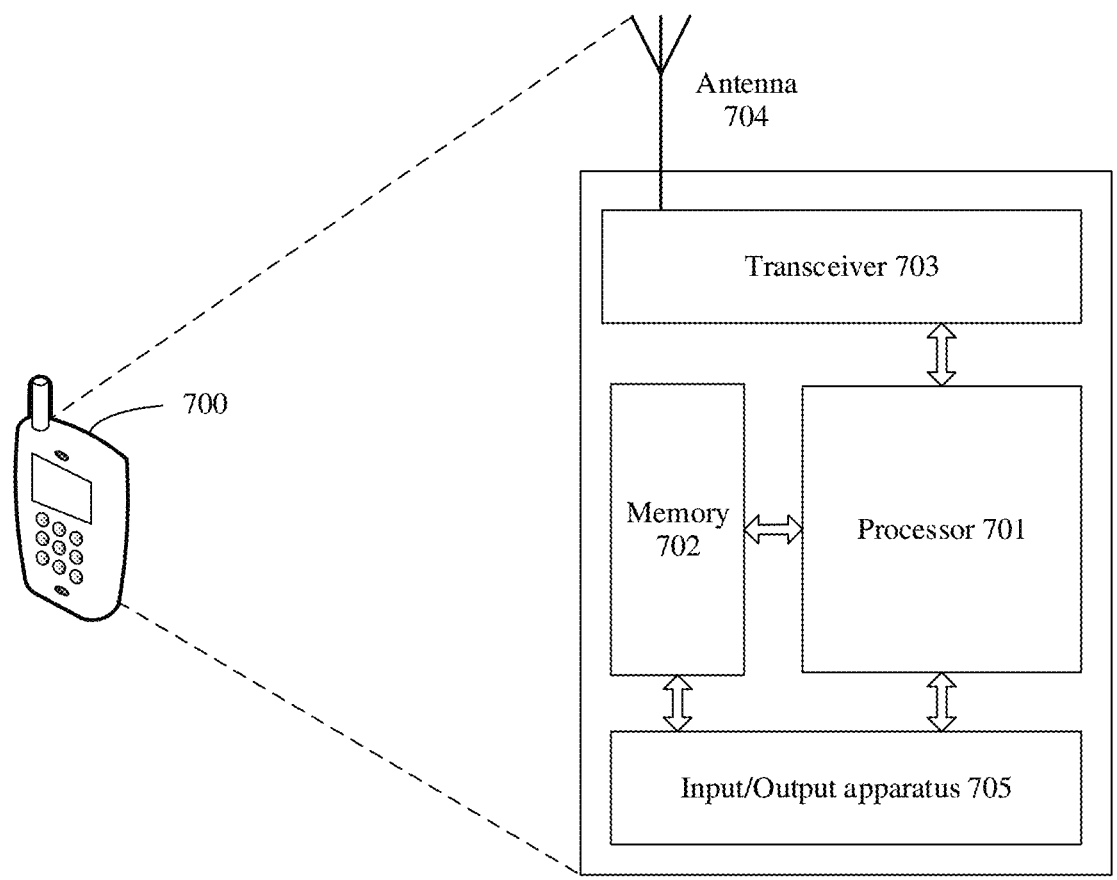
FIG. 7 is a schematic diagram of a structure of a communication apparatus according to an embodiment of this application.

FIG. 7 is a schematic diagram of a structure of a communication apparatus according to an embodiment of this application. The communication apparatus shown in FIG. 7 may be an implementation of a hardware circuit of the communication apparatus shown in FIG. 6. The terminal device is applicable to the flowcharts shown above, and performs functions of the first device in the foregoing method embodiments. For ease of description, FIG. 7 shows only main components of the communication apparatus. Optionally, the first device may alternatively be an apparatus in the terminal device, for example, a chip or a chip system. The chip system includes at least one chip. The chip system may further include another circuit structure and/or discrete device. As shown in FIG. 7, the communication apparatus 700 includes a processor 701, a memory 702, a transceiver 703, an antenna 704, and an input/output apparatus 705. The processor 701 is mainly configured to: process a communication protocol and communication data; control an entire wireless communication apparatus; execute a software program; and process data of the software program. For example, the processor 701 is configured to support the wireless communication apparatus in performing actions described in the foregoing method embodiments. The memory 702 is mainly configured to store a software program and data. The transceiver 703 is mainly configured to perform conversion between a baseband signal and a radio frequency signal and process the radio frequency signal. The antenna 704 is mainly configured to send and receive a radio frequency signal in a form of electromagnetic wave. The input/output apparatus 705, for example, a touchscreen, a display, or a keyboard, is mainly configured to receive data input by a user and output data to the user.

For a specific function performed by the communication apparatus 700 shown in FIG. 7, refer to the description in the procedure shown in FIG. 4 or FIG. 5. Details are not described herein again.

Figure 8:
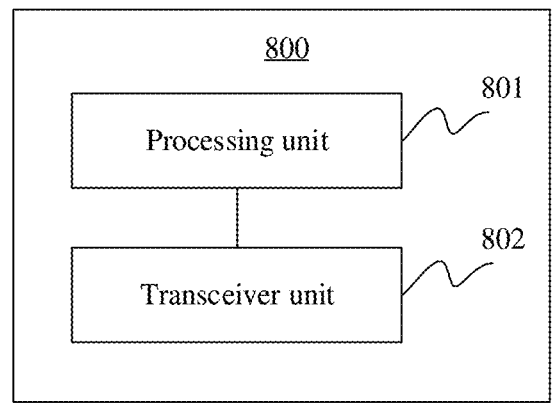
FIG. 8 is a schematic diagram of a structure of a communication apparatus according to an embodiment of this application.

FIG. 8 is a schematic diagram of a structure of a communication apparatus according to an embodiment of this application. The communication apparatus may be configured to perform actions of the second device in the foregoing method embodiments. The communication apparatus 800 includes a processing unit 801 and a transceiver unit 802.

When the communication apparatus 800 performs actions of the second device in the procedure shown in FIG. 4: the processing unit 801 is configured to determine, according to a first preset rule, a first resource in at least two preset resources corresponding to a same gap before a first paging occasion PO; and the transceiver unit 802 is configured to send a wake-up signal sequence to a first device on the first resource.

In a possible design, the processing unit 801 is further configured to: determine, according to the first preset rule, a second resource in at least two preset resources corresponding to a same gap before a second PO, where a resource index value of the second resource in the at least two preset resources corresponding to the same gap before the second PO is different from a resource index value of the first resource in the at least two preset resources corresponding to the same gap before the first PO; and the transceiver unit 802 is further configured to send a wake-up signal sequence to the first device on the second resource.

In a possible design, the first preset rule includes: determining the resource index value based on at least one of an identifier of the first device, a group identifier of a device group to which the first device belongs, a quantity of preset resources configured in the same gap before the first PO, a quantity of device groups configured on each preset resource, a system frame number of a system frame in which the first PO is located, a hyper frame number of a hyper frame in which the first PO is located, and a discontinuous reception cycle of the first device; and determining that the first resource is a preset resource that is in the at least two preset resources corresponding to the same gap before the first PO and that corresponds to the resource index value, where each of the at least two preset resources corresponding to the same gap before the first PO corresponds to one resource index value.

In a possible design, the processing unit is specifically configured to: determine Y based on the group identifier of the device group to which the first device belongs, the quantity of device groups configured on the preset resource, the system frame number of the system frame in which the first PO is located, the hyper frame number of the hyper frame in which the first PO is located, and the discontinuous reception cycle of the first device; and determine the resource index value based on Y, where Y satisfies the following formula:

$$Y = \left(N_{ID}^{Group} + M \cdot \left\lfloor \frac{SFN + 1024 * HFN}{DRX\_cycle} \right\rfloor\right) \mod(N_{total})$$

where $N_{ID}^{Group}$ represents the group identifier of the device group to which the first device belongs, M represents a preset value, a value range of M is [0, P], P represents a minimum value of a quantity of device groups configured on the at least two preset resources, the SFN represents the system frame number of the system frame in which the first PO is located, the HFN represents the hyper frame number of the hyper frame in which the first PO is located, DRX_cycle represents the discontinuous reception cycle of the first device, $N_{total}$ represents a sum of quantities of device groups configured on all of the at least two preset resources, mod represents a modulo operation, and $\lfloor \ \rfloor$ represents a rounding down operation.

In a possible design, the processing unit is specifically configured to: determine, as the resource index value, an index value that is in a preset mapping table and that corresponds to Y, where the preset mapping table includes at least one correspondence, and each correspondence includes one value of Y and an index value corresponding to Y.

In a possible design, the processing unit is specifically configured to: determine Y based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device; and determine the resource index value based on Y, where Y satisfies the following formula:

$$Y = \left(N_{ID}^{Group} + \left\lfloor \frac{SFN + 1024 * HFN}{DRX\_cycle} \right\rfloor\right) \mod(N_{resource})$$

where $N_{ID}^{Group}$ represents the group identifier of the device group to which the first device belongs, $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and $\lfloor \ \rfloor$ represents a rounding down operation.

In a possible design, the processing unit is specifically configured to: determine Y based on the group identifier of the device group to which the first device belongs, the quantity of preset resources configured in the same gap before the first PO, the system frame number of the system frame in which the first PO is located, the hyper frame number of the hyper frame in which the first PO is located, and the discontinuous reception cycle of the first device; and determine the resource index value based on Y, where Y satisfies the following formula:

$$Y = \left(\frac{N_{ID}^{Group}}{N_{ie}} + \left\lfloor \frac{SFN + 1024 * HFN}{DRX\_cycle} \right\rfloor\right) \mod(N_{resource})$$

where $N_{ID}^{Group}$ represents the group identifier of the device group to which the first device belongs, quantities of device groups configured on all of the at least two preset resources are the same, $N_{ie}$ represents the quantity of device groups configured on each of the at least two preset resources, $N_{resource}$ represents the quantity of preset resources configured in the same gap before the first PO, the SFN represents the system frame number of the system frame in which the first PO is located, the HFN represents the hyper frame number of the hyper frame in which the first PO is located, DRX_cycle represents the discontinuous reception cycle of the first device, mod represents a modulo operation, and $\lfloor \ \rfloor$ represents a rounding down operation.

In a possible design, the processing unit is specifically configured to: use Y as the resource index value.

In a possible design, the first preset rule includes: determining the resource index value based on at least one of an identifier of the first device, a system frame number of the first PO, a hyper frame number of the first PO, and a discontinuous reception cycle of the first device; and determining that the first resource is a preset resource that is in the at least two preset resources corresponding to the same gap before the first PO and that corresponds to the resource index value, where each of the at least two preset resources corresponding to the same gap before the first PO corresponds to one resource index value.

In a possible design, the resource index value satisfies one of the following formulas:

$$Val = \left(f(UE\_ID) + \left(\left\lfloor \frac{SFN}{DRX\_cycle} \right\rfloor \Big/ T_{location}\right)\right) \mod N; \text{ and}$$

$$Val = \left( f(\text{UE\_ID}) + \left( \left\lfloor \frac{1024 * HFN + SFN}{\text{DRX\_cycle}} \right\rfloor \Big/ T_{location} \right) \right) \bmod N$$

where Val represents the resource index value, UE_ID is the identifier of the first device, f(UE_ID) is a function of UE_ID, the SFN represents the system frame number of the first PO, the HFN represents the hyper frame number of the first PO, $T_{location}$ represents a preset transformation cycle, DRX_cycle represents the discontinuous reception cycle of the first device, N represents a quantity of preset resources corresponding to a same gap before each PO, mod represents a modulo operation, and $\lfloor \; \rfloor$ represents a rounding down operation.

In a possible design, each preset resource corresponds to at least one group, each group includes at least one first device, and the first preset rule includes: determining that the resource for monitoring the wake-up signal sequence is a preset resource that is in at least two preset resources corresponding to a same gap before a PO and that corresponds to the group identifier of the group to which the first device belongs.

In a possible design, the processing unit is further configured to: configure the quantity of groups corresponding to the preset resource.

When the communication apparatus 800 performs actions of the second device in the procedure shown in FIG. 5: the processing unit 801 is configured to determine at least one first wake-up signal sequence according to a second preset rule; and the transceiver unit 802 is configured to send one of the at least one first wake-up signal sequence on a first preset resource before a first paging occasion PO.

In a possible design, quantities of wake-up signal sequences determined by the processing unit 801 before different POs according to the second preset rule are different; and/or generation parameter sets of at least one wake-up signal sequence determined by the processing unit 801 before the different POs according to the second preset rule are different, where the generation parameter set includes at least one generation parameter, each generation parameter can be used to generate one wake-up signal sequence, and the generation parameter is determined based on a group identifier of a group to which a first device belongs.

In a possible design, the processing unit 801 is further configured to: determine, according to the second preset rule, at least one second wake-up signal sequence to be monitored on a second preset resource before a second PO, where a quantity of the at least one second wake-up signal sequence is different from a quantity of the at least one first wake-up signal sequence, and/or a generation parameter set of the at least one second wake-up signal sequence is different from a generation parameter set of the at least one first wake-up signal sequence, where the generation parameter set includes the at least one generation parameter, the generation parameter can be used to generate the wake-up signal sequence, and the generation parameter is determined based on the group identifier of the group to which the first device belongs.

In a possible design, the second preset rule is: determining a first identifier based on at least one of an identifier of the first device, a system frame number of the first PO, a hyper frame number of the first PO, and a discontinuous reception cycle of the first device; and using, in a preset mapping table corresponding to the first identifier, a wake-up signal sequence corresponding to the group identifier of the group to which the first device belongs as a wake-up signal sequence to be monitored before the first PO, where the preset mapping table includes at least one mapping relationship, each mapping relationship is a mapping relationship between a sequence index value or a generation parameter of a wake-up signal sequence and at least one group identifier, and each group identifier corresponds to one group of devices.

In a possible design, the first identifier satisfies one of the following formulas:

$$\text{Set\_ID} = \left( f(\text{UE\_ID}) + \left\lfloor \frac{SFN}{\text{DRX\_cycle}} \right\rfloor \right) \bmod M; \text{ and}$$

$$\text{Set\_ID} = \left( f(\text{UE\_ID}) + \left\lfloor \frac{1024 * HFN + SFN}{\text{DRX\_cycle}} \right\rfloor \right) \bmod M$$

where Set_ID represents the first identifier, UE_ID represents the identifier of the first device, f(UE_ID) is a function of UE_ID, an SFN represents the system frame number of the first PO, an HFN represents the hyper frame number of the first PO, DRX_cycle represents the discontinuous reception cycle of the first device, M represents a total quantity of preset mapping tables corresponding to the first preset resource, mod represents a modulo operation, $\lfloor \; \rfloor$ represents a rounding down operation, the preset mapping table includes at least one mapping relationship, each mapping relationship is a mapping relationship between a sequence index value of a wake-up signal sequence and at least one group identifier, and each group identifier corresponds to a group of devices.

In a possible design, the quantity of the at least one first wake-up signal sequence is 3 or 4.

Figure 9:
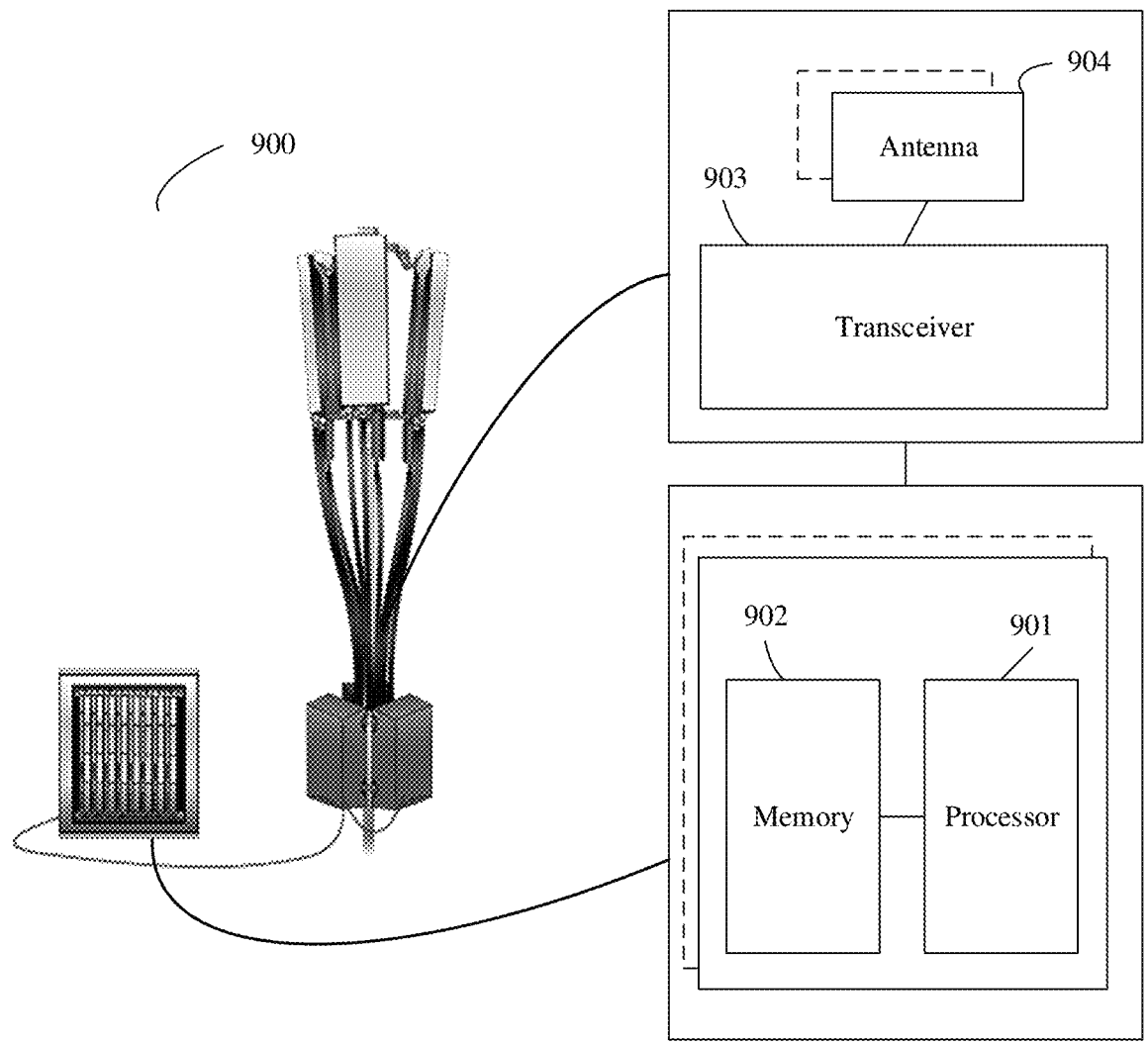
FIG. 9 is a schematic diagram of a structure of a communication apparatus according to an embodiment of this application.

FIG. 9 is a schematic diagram of a structure of a network device according to an embodiment of this application. The communication apparatus shown in FIG. 9 may be an implementation of a hardware circuit of the communication apparatus shown in FIG. 8. The communication apparatus is applicable to the flowcharts shown in FIG. 4 or FIG. 5, and performs functions of the second device in the foregoing method embodiments. For ease of description, FIG. 9 shows only main components of the communication apparatus. Optionally, the communication apparatus may be a network device, or may be an apparatus, for example, a chip or a chip system, in the network device. The chip system includes at least one chip, and the chip system may further include another circuit structure and/or discrete device. Optionally, that the communication apparatus is a network device is used as an example. As shown in FIG. 9, the network device 900 includes a processor 901, a memory 902, a transceiver 903, an antenna 904, and the like.

For a specific function performed by the communication apparatus 900 shown in FIG. 9, refer to the description in the procedure shown in FIG. 4 or FIG. 5. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of the process and/or the block in the flowcharts and/or the block diagrams. The computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specified function in one or more processes in the flowcharts and/or in one or more blocks in the block diagrams.

These computer program instructions may be stored in a computer-readable memory that can instruct the computer or another programmable data processing device to work in a specified manner, so that the instructions stored in the computer-readable memory generate an artifact that includes an instruction apparatus. The instruction apparatus implements a specified function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of the claims of this application and their equivalent technologies.

What is claimed is:

1. An apparatus, comprising:
   at least one processor; and
   one or more non-transitory memories coupled to the at least one processor and storing programming instructions for execution by the at least one processor, the programming instructions including instructions to:
   determine, according to a first preset rule, a first preset resource in a first at least two preset resources corresponding to a same gap before a first paging occasion (PO); and
   monitor for at least one wake-up signal sequence on the first preset resource, and
   wherein the first preset rule comprises:
   a first resource index value is determined based on a hyper frame number of the first PO; and
   the first preset resource is determined by determining a preset resource that is in the first at least two preset resources and that corresponds to the first resource index value, wherein each preset resource of the first at least two preset resources corresponds to one respective resource index value.

2. The apparatus according to claim 1, wherein the programming instructions further include instructions to:
   determine, according to a second preset rule, a second preset resource in a second at least two preset resources corresponding to a same gap before a second PO; and
   monitor for at least one wake-up signal sequence on the second preset resource.

3. The apparatus according to claim 2, wherein a second resource index value of the second preset resource in the second at least two preset resources is different from the first resource index value of the first preset resource in the first at least two preset resources.

4. The apparatus according to claim 1, wherein the first preset rule comprises:
   the first resource index value is determined further based on at least one of an identifier of the apparatus, a system frame number of the first PO, or a discontinuous reception cycle of the apparatus.

5. The apparatus according to claim 4, wherein the first resource index value satisfies one of the following formulas:

$$Val = \left(f(\text{UE\_ID}) + \left(\left\lfloor \frac{SFN}{DRX_{cycle}} \right\rfloor\right)\right) \bmod N; \text{ or}$$

$$Val = \left(f(\text{UE\_ID}) + \left(\left\lfloor \frac{1024 * HFN + SFN}{DRX_{cycle}} \right\rfloor\right)\right) \bmod N;$$

and
wherein Val represents the first resource index value, UE_ID represents the identifier of the apparatus, f(UE_ID) represents a function of UE_ID, SFN represents the system frame number of the first PO, the HFN represents the hyper frame number of the first PO, $DRX_{cycle}$ represents the discontinuous reception cycle of the apparatus, N represents a quantity of preset resources corresponding to a same gap before each PO, mod represents a modulo operation, and $\lfloor \ \rfloor$ represents a rounding down operation.

6. The apparatus according to claim 1, wherein the first preset rule comprises:
   the first resource index value is determined further based on at least one of an identifier of the apparatus, a group identifier of a device group to which the apparatus belongs, a quantity of preset resources configured in the same gap before the first PO, a quantity of device groups configured on each preset resource configured in the same gap before the first PO, a system frame number of a system frame in which the first PO is located or a discontinuous reception cycle of the apparatus.

7. The apparatus according to claim 6, wherein the programming instructions include instructions for:
   determining a first value Y based on the group identifier of the device group to which the apparatus belongs, the quantity of device groups configured on each preset resource configured in the same gap before the first PO, the system frame number of the system frame in which the first PO is located, the hyper frame number of the first PO, and the discontinuous reception cycle of the apparatus; and
   determining the first resource index value based on the first value Y; and
   wherein Y satisfies the following formula:

$$Y = \left(N_{ID}^{Group} + M \cdot \left\lfloor \frac{SFN + 1024 * HFN}{DRX_{cycle}} \right\rfloor\right) \bmod(N_{total})$$

wherein $N_{ID}^{Group}$ represents the group identifier of the device group to which the apparatus belongs, M represents a preset value, a value range of M is [0, P], P represents a minimum value of a quantity of device groups configured on the first at least two preset resources, SFN represents the system frame number of the system frame in which the first PO is located, HFN represents the hyper frame number of the the first PO, $DRX_{cycle}$ represents the discontinuous reception cycle of the apparatus, $N_{total}$ represents a sum of quantities of device groups configured on all of the first at least two preset resources, mod represents a modulo operation, and $\lfloor \ \rfloor$ represents a rounding down operation.

8. The apparatus according to claim 7, wherein a value range of $N_{ID}^{Group}$ is $[0, N_{total}-1]$.

9. The apparatus according to claim 1, wherein each preset resource of the first at least two preset resources corresponds to at least one group, each group of the at least one group comprises at least one first device, and the first preset rule further comprises:
the first preset resource to use to monitor for the at least one wake-up signal sequence is determined to be a preset resource that corresponds to a group identifier of a group to which the first device belongs.

10. An apparatus, comprising:
at least one processor; and
one or more non-transitory memories coupled to the at least one processor and storing programming instructions for execution by the at least one processor, the programming instructions including instructions to:
determine, according to a first preset rule, a first preset resource in a first at least two preset resources, the first at least two preset resources corresponding to a same gap before a first paging occasion (PO); and
send a first wake-up signal sequence to a first device on the first preset resource; and
wherein the first preset rule comprises:
a first resource index value is determined based on a hyper frame number of the first PO; and
the first preset resource is determined by determining a preset resource that is in the first at least two preset resources and that corresponds to the first resource index value, wherein each preset resource of the first at least two preset resources corresponds to one respective resource index value.

11. The apparatus according to claim 10, wherein the programming instructions further include instructions to:
determine, according to a second preset rule, a second preset resource in a second at least two preset resources, the second at least two preset resources corresponding to a same gap before a second PO; and
send a second wake-up signal sequence to the first device on the second preset resource.

12. The apparatus according to claim 11, wherein a second resource index value of the second preset resource in the second at least two preset resources is different from the first resource index value of the first preset resource in the first at least two preset resources.

13. The apparatus according to claim 10, wherein the first preset rule comprises:
the first resource index value is determined further based on at least one of an identifier of the first device, a group identifier of a device group to which the first device belongs, a quantity of preset resources configured in the same gap before the first PO, a quantity of device groups configured on each preset resource configured in the same gap before the first PO, a system frame number of a system frame in which the first PO is located or a discontinuous reception cycle of the first device.

14. The apparatus according to claim 13, wherein the programming instructions include instructions for:
determining a first value Y based on the group identifier of the device group to which the first device belongs, the quantity of device groups configured on each preset resource configured in the same gap before the first PO, the system frame number of the system frame in which the first PO is located, the hyper frame number of the first PO and the discontinuous reception cycle of the first device; and
determining the first resource index value based on the first value Y;
wherein Y satisfies the following formula:

$$Y = \left(N_{ID}^{Group} + M \cdot \left\lfloor \frac{SFN + 1024 * HFN}{DRX_{cycle}} \right\rfloor \right) \mod(N_{total}),$$

wherein $N_{ID}^{Group}$ represents the group identifier of the device group to which the first device belongs, M represents a preset value, a value range of M is [0, P], P represents a minimum value of a quantity of device groups configured on the first at least two preset resources, SFN represents the system frame number of the system frame in which the first PO is located, HFN represents the hyper frame number of the first PO $DRX_{cycle}$ represents the discontinuous reception cycle of the first device, $N_{total}$ represents a sum of quantities of device groups configured on all of the first at least two preset resources, mod represents a modulo operation, and $\lfloor \ \rfloor$ represents a rounding down operation.

15. The apparatus according to claim 14, wherein a value range of $N_{ID}^{Group}$ is $[0, N_{total}-1]$.

16. The apparatus according to claim 10, wherein the first preset rule comprises:
the first resource index value is determined further based on at least one of an identifier of the first device, a system frame number of the first PO, or a discontinuous reception cycle of the first device.

17. The apparatus according to claim 16, wherein the first resource index value satisfies one of the following formulas:

$$Val = \left(f(UE\_ID) + \left(\left\lfloor \frac{SFN}{DRX_{cycle}} \right\rfloor\right)\right) \mod N; \text{ or}$$

$$Val = \left(f(UE\_ID) + \left(\left\lfloor \frac{1024 * HFN + SFN}{DRX_{cycle}} \right\rfloor\right)\right) \mod N;$$

wherein Val represents the first resource index value, UE_ID represents the identifier of the first device, f(UE_ID) is a function of UE_ID, SFN represents the system frame number of the first PO, HFN represents the hyper frame number of the first PO, $DRX_{cycle}$ represents the discontinuous reception cycle of the first device, N represents a quantity of preset resources corresponding to a same gap before each PO, mod represents a modulo operation, and $\lfloor \ \rfloor$ represents a rounding down operation.

18. A method, comprising:
determining, by a first device according to a first preset rule, a first preset resource in a first at least two preset resources, the first at least two preset resources corresponding to a same gap before a first paging occasion (PO); and
monitoring, by the first device, for at least one wake-up signal sequence on the first preset resource; and
wherein the first preset rule comprises:
a first resource index value is determined based on a hyper frame number of the first PO; and
the first preset resource is determined by determining a preset resource that is in the first at least two preset resources and that corresponds to the first resource index value, wherein each preset resource of the first at least two preset resources corresponds to one respective resource index value.

19. The method according to claim 18, wherein the first preset rule comprises:
   the first resource index value is determined further based on at least one of an identifier of the first device, a system frame number of the first PO, or a discontinuous reception cycle of the first device.

20. A method, comprising:
   determining, by a second device according to a first preset rule, a first preset resource in a first at least two preset resources corresponding to a same gap before a first paging occasion (PO);
   sending, by the second device, a wake-up signal sequence to a first device on the first preset resource; and
   wherein the first preset rule comprises:
      a first resource index value is determined based on a hyper frame number of the first PO; and
      the first preset resource is determined by determining a preset resource that is in the first at least two preset resources and that corresponds to the first resource index value, wherein each preset resource of the first at least two preset resources corresponds to one respective resource index value.

* * * * *